US012210364B2

(12) United States Patent
Liu et al.

(10) Patent No.: US 12,210,364 B2
(45) Date of Patent: Jan. 28, 2025

(54) VOLTAGE REGULATION CIRCUIT AND METHOD, OPERATION SYSTEM, INTEGRATED MODULE, AND CIRCUIT

(71) Applicant: HUAWEI TECHNOLOGIES CO., LTD., Shenzhen (CN)

(72) Inventors: Taiyuan Liu, Xi'an (CN); Ding Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/047,660

(22) Filed: Oct. 19, 2022

(65) Prior Publication Data

US 2023/0113887 A1    Apr. 13, 2023

Related U.S. Application Data

(63) Continuation of application No. PCT/CN2020/085721, filed on Apr. 20, 2020.

(51) Int. Cl.
    *G05F 1/10*     (2006.01)
    *G05F 1/46*     (2006.01)

(52) U.S. Cl.
    CPC . *G05F 1/10* (2013.01); *G05F 1/46* (2013.01)

(58) Field of Classification Search
    None
    See application file for complete search history.

(56) References Cited

U.S. PATENT DOCUMENTS

| 6,333,652 B1 * | 12/2001 | Iida | H03L 7/0805 327/284 |
| 6,414,527 B1 * | 7/2002 | Seno | G06F 1/3296 327/158 |
| 6,570,456 B2 * | 5/2003 | Mano | H03L 7/07 327/158 |
| 6,657,467 B2 * | 12/2003 | Seki | H03L 7/0805 327/27 |

(Continued)

FOREIGN PATENT DOCUMENTS

| CA | 2887838 A1 | 4/2015 |
| CN | 1790214 A | 6/2006 |

(Continued)

OTHER PUBLICATIONS

Rahman Fahim UR et al: "A Unified Clock and Switched-Capacitor Based Power Delivery Architecture for Variation Tolerance in Low Voltage SoC Domains", IEEE Journal of Solid-State Circuits, IEEE, USA, vol. 54, No. 4, Apr. 1, 2019, pp. 1173-1184, XP011716794.

*Primary Examiner* — Thomas J. Hiltunen

(57) ABSTRACT

A voltage regulation circuit mainly includes an oscillator and a regulation circuit. The oscillator is connected to a power supply circuit configured to supply power to a logic circuit, and a process corner type of the oscillator is the same as a process corner type of the logic circuit. The oscillator may generate a first clock signal based on an output voltage of the power supply circuit. The regulation circuit may control, based on the first clock signal, the power supply circuit to regulate the output voltage. For a logic circuit of an SS corner type, the output voltage of the power supply circuit may be increased, and for a logic circuit of an FF corner type, the output voltage of the power supply circuit may be decreased.

20 Claims, 9 Drawing Sheets

(56) References Cited

U.S. PATENT DOCUMENTS

| | | | |
|---|---|---|---|
| 6,756,838 B1 | 6/2004 | Wu et al. | |
| 6,924,679 B2* | 8/2005 | Seno | G06F 1/3203 |
| | | | 327/158 |
| 7,319,358 B2* | 1/2008 | Senthinathan | G11C 5/147 |
| | | | 327/530 |
| 7,417,482 B2* | 8/2008 | Elgebaly | G06F 1/3296 |
| | | | 327/407 |
| 7,583,555 B2* | 9/2009 | Kang | G06F 1/324 |
| | | | 365/226 |
| 8,008,967 B2* | 8/2011 | Okano | H03L 1/00 |
| | | | 327/544 |
| 8,051,312 B2* | 11/2011 | Foley | G06F 1/3203 |
| | | | 713/340 |
| 8,085,020 B1* | 12/2011 | Bennett | H02M 3/156 |
| | | | 323/283 |
| 8,250,395 B2 | 8/2012 | Carter et al. | |
| 8,324,974 B1* | 12/2012 | Bennett | G06F 1/324 |
| | | | 331/44 |
| 8,339,190 B2* | 12/2012 | Otsuga | G01R 31/31725 |
| | | | 327/540 |
| 8,441,310 B2* | 5/2013 | Senthinathan | G06F 1/3243 |
| | | | 307/130 |
| 8,661,274 B2 | 2/2014 | Hansquine et al. | |
| 8,797,095 B2 | 8/2014 | Moore et al. | |
| 8,954,764 B2* | 2/2015 | Pinto | H03K 19/0016 |
| | | | 713/323 |
| 9,235,678 B2* | 1/2016 | Moughabghab | G06F 30/398 |
| 9,354,690 B1* | 5/2016 | Joffe | G06F 1/324 |
| 9,529,377 B2 | 12/2016 | Wang et al. | |
| 10,476,511 B2* | 11/2019 | Hiraku | H03L 7/097 |
| 11,082,053 B1* | 8/2021 | Yan | H03L 7/093 |
| 11,092,646 B1* | 8/2021 | Ghosh | G11C 11/4076 |
| 2004/0090216 A1 | 5/2004 | Carballo et al. | |
| 2008/0231352 A1 | 9/2008 | Kurd et al. | |
| 2009/0066408 A1 | 3/2009 | Fujiwara | |
| 2009/0316498 A1 | 12/2009 | Chen et al. | |
| 2015/0028931 A1 | 1/2015 | Xie et al. | |
| 2018/0045779 A1 | 2/2018 | Cao et al. | |
| 2019/0334509 A1 | 10/2019 | Gupta et al. | |

FOREIGN PATENT DOCUMENTS

| | | |
|---|---|---|
| CN | 101383558 A | 3/2009 |
| CN | 103631294 A | 3/2014 |
| CN | 103825611 A | 5/2014 |
| CN | 105159372 A | 12/2015 |
| CN | 105811926 A | 7/2016 |
| CN | 106160462 A | 11/2016 |
| CN | 106300923 A | 1/2017 |
| CN | 106873696 A | 6/2017 |
| CN | 108491016 A | 9/2018 |
| CN | 109672441 A | 4/2019 |
| CN | 110120805 A | 8/2019 |
| CN | 110752846 A | 2/2020 |
| EP | 1184962 A1 | 3/2002 |
| TW | 201405272 A | 2/2014 |
| WO | 2013095390 A1 | 6/2013 |

* cited by examiner

Generate a first clock signal by using an oscillator based on an output voltage of a power supply circuit, where a process corner type of the oscillator is the same as a process corner type of a logic circuit, and the output voltage of the power supply circuit is used to supply power to the logic circuit ⎯ S801

Generate a first clock signal by using an oscillator based on an output voltage of a power supply circuit, where a process corner type of the oscillator is the same as a process corner type of a logic circuit, and the output voltage of the power supply circuit is used to supply power to the logic circuit ⎯ S802

VOLTAGE REGULATION CIRCUIT AND METHOD, OPERATION SYSTEM, INTEGRATED MODULE, AND CIRCUIT

CROSS-REFERENCE TO RELATED APPLICATIONS

This application is a continuation of International Application No. PCT/CN2020/085721, filed on Apr. 20, 2020, the disclosure of which is hereby incorporated by reference in its entirety.

TECHNICAL FIELD

This application relates to the field of integrated circuit technologies, and in particular, to a voltage regulation circuit and method, an operation system, an integrated module, and a circuit.

BACKGROUND

With development of a semiconductor process towards deep submicron, logical operation speeds of semiconductor devices gradually increase. Based on different process corner (process corner) types, the semiconductor devices may be classified into a fast fast corner (FF corner) device, a slow slow corner (SS corner) device, and a typical typical corner (TT corner) device. The TT corner device is a standard semiconductor device. Compared with the TT corner device, the FF corner device has a shorter delay and a faster logical operation speed, and the SS corner device has a longer delay and a slower logical operation speed.

On the basis of a plurality of semiconductor devices, a logic circuit may be further formed. Process corner types of logic circuits may include a TT corner, an FF corner, and an SS corner. It may be considered that a process corner type of the plurality of semiconductor devices in the logic circuit is the same as that of the logic circuit.

Generally, at a standard temperature, when working timing of the logic circuits is fixed, a timing margin of a logic circuit of the TT corner type is sufficient, but timing margins of a logic circuit of the SS corner type and a logic circuit of the FF corner type each are insufficient.

SUMMARY

The present disclosure provides a voltage regulation circuit and method, an operation system, an integrated module, and a circuit, to optimize timing margins of a logic circuit of an SS corner type and a logic circuit of an FF corner type.

According to a first aspect, an embodiment of this disclosure provides a voltage regulation circuit. The voltage regulation circuit mainly includes an oscillator and a regulation circuit. The oscillator is connected to a power supply circuit, an output voltage of the power supply circuit is used to supply power to a logic circuit, and a process corner type of the oscillator is the same as a process corner type of the logic circuit. The oscillator may generate a first clock signal based on the output voltage of the power supply circuit. The regulation circuit may control, based on the first clock signal, the power supply circuit to regulate the output voltage.

In an embodiment of this disclosure, the oscillator may generate the first clock signal based on the output voltage of the power supply circuit, and the oscillator has the same process corner type as that of the logic circuit. It may be understood that the process corner type of the oscillator also affects the first clock signal, and therefore first clock signals output by oscillators of different process corner types are slightly different. For example, when the output voltage of power supply circuit remains unchanged, an oscillator of a TT corner type may output a first clock signal of a standard frequency; an oscillator of an SS corner type outputs a first clock signal of a low frequency; and an oscillator of an FF corner type outputs a first clock signal of a high frequency.

Therefore, the regulation circuit may distinguish the logic circuits of different process corner types based on the first clock signals, and further control the power supply circuit to adaptively regulate the output voltage. For example, when the frequency of the first clock signal is low, it indicates that the logic circuit is of the SS corner type. The regulation circuit may control the power supply circuit to increase the output voltage, so that a logical operation speed of the logic circuit is increased and a timing margin of the logic circuit is optimized. For another example, when the frequency of the first clock signal is high, it indicates that the logic circuit is of the FF corner type. The regulation circuit may control the power supply circuit to decrease the output voltage, so that a logical operation speed of the logic circuit is decreased and a timing margin of the logic circuit is optimized.

In addition, currently, when working timing of the logic circuits is designed, to increase the timing margins of the logic circuit of the SS corner type and the logic circuit of the FF corner type, operating frequencies of the logic circuits usually need to be decreased, to prolong setup times or hold times. In other words, current operating frequencies of the logic circuits usually cannot reach their optimal operating frequencies. However, when the voltage regulation circuit provided in an embodiment of this disclosure is used, the logic circuit can represent a timing characteristic of the logic circuit of the TT corner type, and an operating frequency of the logic circuit does not need to be decreased. In this way, a logical operation speed of the logic circuit is increased.

In addition, currently, when the working timing of the logic circuits is designed, the output voltage of the power supply circuit remains unchanged, and the logic circuits of different process corner types and different operating frequencies all operate at a same voltage. Therefore, the power supply circuit needs to reserve a specific voltage margin. Especially when the logic circuit is of the FF corner type, the output voltage of the power supply circuit is wasted to a great extent. However, in an embodiment of this disclosure, the voltage regulation circuit matches the output voltage of the power supply circuit for the logic circuit, and the voltage margin does not need to be reserved. Therefore, this helps further reduce power consumption of the logic circuit.

A specific structure of the oscillator is not limited in an embodiment of this disclosure. For example, the oscillator may include a first path, and a delay of the first path is positively correlated with a delay of a second path of the logic circuit. In this case, the oscillator may generate the first clock signal through the first path based on the output voltage of the power supply circuit.

In a possible implementation, the second path may be any logical path in the logic circuit.

In another possible implementation, the second path may also be a logical path with a critical timing margin in the logic circuit; or the second path may be referred to as a critical timing path, or a timing critical path. In this case, the delay of the first path in the oscillator may be linearly positively correlated with the delay of the second path, and a change degree of the delay of the first path is consistent with a change degree of the delay of the second path. In this implementation, in the logic circuit of the SS corner type and the logic circuit of the FF corner type, the second path (the critical timing path) can represent a timing characteristic of the logic circuit of the TT corner type. A timing margin of the second path determines whether the logic circuit can operate normally as a whole. Therefore, that the delay of the first path is linearly positively correlated with the delay of the second path helps optimize the timing margin of the logic circuit to a maximum extent and improve stability of the logic circuit.

For example, in the oscillator provided in an embodiment of this disclosure, the first path may include a plurality of serially-connected first gate circuits, and the plurality of serially-connected first gate circuits may make the delay of the first path linearly positively correlated with the delay of the second path. In an embodiment, each first gate circuit generates a specific delay, and delays of the plurality of serially-connected first gate circuits are accumulated, so that the delay of the first path is linearly positively correlated with the delay of the second path.

Still further, each first gate circuit in the first path corresponds to at least one second gate circuit in the second path, a function type of the first gate circuit is the same as a function type of the corresponding at least one second gate circuit, and a threshold voltage type of the first gate circuit is the same as a threshold voltage type of the corresponding at least one second gate circuit. Function types of the gate circuits are classified based on standard cells. Generally, the gate circuits may be classified into an AND gate circuit, an OR gate circuit, a NOT gate circuit, and the like. In an embodiment of this disclosure, the first gate circuit and the second gate circuit that have the same function type have the same threshold voltage type. In an embodiment, threshold voltage types of the gate circuits may be classified into at least the following types: an ultra-high threshold voltage, a standard threshold voltage, a low threshold voltage, or an ultra-low threshold voltage. In this implementation, a more accurate linear positive correlation relationship can be maintained between the delay of the first path and the delay of the second path. This helps further improve optimization effect of the timing margin of the logic circuit.

To further expand an application scope of the oscillator, in an embodiment of this disclosure, the oscillator may further configure some or all of a plurality of gate circuits in the oscillator as the foregoing plurality of first gate circuits in the first path based on received configuration information. The oscillator flexibly configures the plurality of first gate circuits in the first path based on the configuration information, so that the delay of the first path can be flexibly adjusted. Therefore, even if a structure of the second path in the logic circuit changes in different scenarios, the oscillator can maintain matching (the linear positive correlation) between the first path and the second path, so that the voltage regulation circuit can adapt to logic circuits in a plurality of scenarios.

For example, the oscillator in an embodiment of this disclosure has at least the following two possible structures:

Structure 1: The plurality of gate circuits in the oscillator form a first series structure, and the oscillator further includes a first selector and a supplementary inverter. The first series structure may include a plurality of delay circuits, each delay circuit includes one or more gate circuits, an input signal and an output signal of each delay circuit have a same phase, an output end of each delay circuit is connected to a data input end of the first selector, an input end of the first series structure is connected to an output end of the supplementary inverter, and an output end of the first selector is connected to an input end of the supplementary inverter. The first selector is configured to output a first intermediate signal based on received first configuration information. The first configuration information indicates a target delay circuit in the plurality of delay circuits, the first intermediate signal is an output signal of the target delay circuit, and gate circuits between the input end of the first series structure and an output end of the target delay circuit are the plurality of first gate circuits. The supplementary inverter is configured to receive the first intermediate signal, and output the first clock signal based on the first intermediate signal.

It may be understood that an oscillation loop formed by the first path needs to include an odd number of gate circuits to implement an oscillator function. In an embodiment of this disclosure, the input signal and the output signal of each delay circuit have the same phase. Therefore, from a perspective of a phase change, each delay circuit may be equivalent to an even number of gate circuits. In this case, regardless that the first configuration information indicates any delay circuit as the target delay circuit, a quantity of first gate circuits in the first path is equivalent to an even number of phase inverters. In addition, due to the supplementary inverter, an odd number of inverters may be always maintained in the oscillation loop formed by the first path, to ensure implementation of a function of the oscillator.

Structure 2: One part of the plurality of gate circuits forms a second series structure, the other part of the plurality of gate circuits forms a third series structure, and the oscillator may further include a second selector, a third selector, and a supplementary inverter. The second series structure may include a plurality of low-load delay circuits, each low-load delay circuit includes one or more gate circuits, an input signal and an output signal of each low-load delay circuit have a same phase, an output end of each low-load delay circuit is connected to a data input end of the second selector, and an input end of the second series structure is connected to an output end of the supplementary inverter. The third series structure may include a plurality of high-load delay circuits, each high-load delay circuit includes one or more gate circuits, an input signal and an output signal of each high-load delay circuit have a same phase, an output end of each high-load delay circuit is connected to a data input end of the third selector, and an input end of the third series structure is connected to the second selector.

The second selector is configured to output a second intermediate signal based on received second configuration information. The second configuration information indicates a target low-load delay circuit in the plurality of low-load delay circuits, the second intermediate signal is an output signal of the target low-load delay circuit, and gate circuits between the input end of the second series structure and an output end of the target low-load delay circuit are the one part of the plurality of first delay circuits. The third selector is configured to output a third intermediate signal based on received third configuration information. The third configuration information indicates a target high-load delay circuit in the plurality of high-load delay circuits, the third intermediate signal is an output signal of the target high-load delay circuit, and gate circuits between the input end of the third series structure and an output end of the target high-load delay circuit are the other part of the plurality of first delay circuits. The supplementary inverter is configured to receive the third intermediate signal, and output the first clock signal based on the third intermediate signal.

For example, the high-load delay circuit may further include at least one load routing. The load routing may be understood as a connection line connected in series with a load, or may be understood as a connection line whose trace length reaches a specific threshold. For example, in the logic circuit, for consideration of aspects such as a line layout, lengths of traces in some parts of the logical path are excessively long. Consequently, load is large and a delay of the logical path is increased. In view of this, in an embodiment of this disclosure, a quantity of low-load delay circuits and a quantity of high-load delay circuits may be flexibly configured based on a load status of the second path in the logic circuit, to maintain delay matching between the first path and the second path.

In an embodiment of this disclosure, the regulation circuit may include a frequency divider, a frequency comparator, and a controller. The frequency divider is separately connected to the oscillator and the frequency comparator, the frequency comparator is connected to the controller, and the controller may be connected to the power supply circuit. The frequency divider may perform frequency division on the first clock signal based on a frequency division multiple to obtain a second clock signal. The frequency comparator may receive a reference clock signal, and output a frequency difference signal based on the second clock signal and the reference clock signal, where the frequency difference signal may indicate a relative frequency value relationship between the second clock signal and the reference clock signal. The controller may control, based on the frequency difference signal, the power supply circuit to regulate the output voltage.

For example, a quotient obtained through division of a frequency of a first clock signal output by the oscillator of the TT corner type by a frequency of the reference clock signal is the foregoing frequency division multiple. It should be noted that a temperature may also slightly affect a delay of the oscillator. Therefore, in an embodiment of this disclosure, a quotient obtained through division of the frequency of the first clock signal by the frequency of the reference clock signal at a standard temperature is the foregoing frequency division multiple.

That the controller controls the power supply circuit to regulate the output voltage based on the foregoing frequency difference signal is that: When the frequency difference signal indicates that a frequency of the second clock signal is greater than the frequency of the reference clock signal, the controller controls the power supply circuit to decrease the output voltage; or when the frequency difference signal indicates that a frequency of the second clock signal is less than the frequency of the reference clock signal, the controller controls the power supply circuit to increase the output voltage.

To further improve accuracy of the controller, in an embodiment of this disclosure, the regulation circuit may further include a low-pass filter. An input end of the low-pass filter is connected to the frequency comparator, and an output end of the low-pass filter is connected to the controller. The low-pass filter may filter the frequency difference signal, and output a filtered frequency difference signal to the controller. After the frequency difference signal is filtered by the low-pass filter, signal quality of the frequency difference signal can be improved, and accuracy of the controller is improved.

According to a second aspect, an embodiment of this disclosure provides a voltage regulation circuit. The voltage regulation circuit not only can regulate an output voltage of a power supply circuit, but also has a large application scope. For technical effects of a corresponding solution in the second aspect, refer to technical effects that can be obtained using a corresponding solution in the first aspect. Repeated parts are not described herein again.

For example, the voltage regulation circuit mainly includes an oscillator and a regulation circuit. The oscillator includes a first path. The oscillator may configure a plurality of gate circuits in the first path as a plurality of first gate circuits based on received configuration information. The plurality of first gate circuits are configured to make a delay of the first path linearly positively correlated with a delay of a second path in a logic circuit.

The oscillator may be further connected to a power supply circuit, and generates a first clock signal through the first path based on an output voltage of the power supply circuit. The output voltage of the power supply circuit is used to supply power to the logic circuit, and a process corner type of the oscillator is the same as a process corner type of the logic circuit.

The regulation circuit may control, based on the first clock signal, the power supply circuit to regulate the output voltage.

In a possible implementation, the second path may be any logical path in the logic circuit.

In another possible implementation, the second path may be a logical path with a critical timing margin in the logic circuit; or may be referred to as a critical timing path, or a timing critical path.

For example, for any first gate circuit in the first path, a second gate circuit having a same function type as the first gate circuit exists in the second path, and the first gate circuit has a same threshold voltage type as that of the second gate circuit. For example, the threshold voltage type of the first gate circuit is any one of the following threshold voltage types: an ultra-high threshold voltage uhvt, a high threshold voltage hvt, a standard threshold voltage svt, a low threshold voltage lvt, or an ultra-low threshold voltage ulvt.

In an embodiment of this disclosure, the oscillator has at least the following two possible structures:

Structure 1: A plurality of gate circuits in the oscillator form a first series structure. The oscillator further includes a first selector and a supplementary inverter. The first series structure may include a plurality of delay circuits, each delay circuit includes one or more gate circuits, an input signal and an output signal of each delay circuit have a same phase, an output end of each delay circuit is connected to a data input end of the first selector, an input end of the first series structure is connected to an output end of the supplementary inverter, and an output end of the first selector is connected to an input end of the supplementary inverter. The first selector is configured to output a first intermediate signal based on received first configuration information. The first configuration information indicates a target delay circuit in the plurality of delay circuits, the first intermediate signal is an output signal of the target delay circuit, and gate circuits between the input end of the first series structure and an output end of the target delay circuit are the plurality of first gate circuits. The supplementary inverter is configured to receive the first intermediate signal, and output the first clock signal based on the first intermediate signal.

Structure 2: One part of the plurality of gate circuits in the oscillator forms a second series structure, the other part of the plurality of gate circuits forms a third series structure, and the oscillator may further include a second selector, a third selector, and a supplementary inverter. The second series structure may include a plurality of low-load delay circuits, each low-load delay circuit includes one or more gate circuits, an input signal and an output signal of each low-load delay circuit have a same phase, an output end of each low-load delay circuit is connected to a data input end of the second selector, and an input end of the second series structure is connected to an output end of the supplementary inverter. The third series structure may include a plurality of high-load delay circuits, each high-load delay circuit includes one or more gate circuits, an input signal and an output signal of each high-load delay circuit have a same phase, an output end of each high-load delay circuit is connected to a data input end of the third selector, and an input end of the third series structure is connected to the second selector. The second selector is configured to output a second intermediate signal based on received second configuration information. The second configuration information indicates a target low-load delay circuit in the plurality of low-load delay circuits, the second intermediate signal is an output signal of the target low-load delay circuit, and gate circuits between the input end of the second series structure and an output end of the target low-load delay circuit are the one part of the plurality of first delay circuits. The third selector is configured to output a third intermediate signal based on received third configuration information. The third configuration information indicates a target high-load delay circuit in the plurality of high-load delay circuits, the third intermediate signal is an output signal of the target high-load delay circuit, and gate circuits between the input end of the third series structure and an output end of the target high-load delay circuit are the other part of the plurality of first delay circuits. The supplementary inverter is configured to receive the third intermediate signal, and output the first clock signal based on the third intermediate signal.

For example, the high-load delay circuit may further include at least one load routing.

In an embodiment of this disclosure, the regulation circuit may include a frequency divider, a frequency comparator, and a controller. The frequency divider is separately connected to the oscillator and the frequency comparator, the frequency comparator is connected to the controller, and the controller may be connected to the power supply circuit. The frequency divider may perform frequency division on the first clock signal based on a frequency division multiple to obtain a second clock signal. The frequency comparator may receive a reference clock signal, and output a frequency difference signal based on the second clock signal and the reference clock signal, where the frequency difference signal may indicate a relative frequency value relationship between the second clock signal and the reference clock signal. The controller may control, based on the frequency difference signal, the power supply circuit to regulate the output voltage.

For example, a quotient obtained through division of a frequency of a first clock signal output by an oscillator of a TT corner type by a frequency of the reference clock signal is the foregoing frequency division multiple.

That the controller controls the power supply circuit to regulate the output voltage based on the foregoing frequency difference signal is that: When the frequency difference signal indicates that a frequency of the second clock signal is greater than the frequency of the reference clock signal, the controller controls the power supply circuit to decrease the output voltage; or when the frequency difference signal indicates that a frequency of the second clock signal is less than the frequency of the reference clock signal, the controller controls the power supply circuit to increase the output voltage.

To further improve accuracy of the controller, in an embodiment of this disclosure, the regulation circuit may further include a low-pass filter. An input end of the low-pass filter is connected to the frequency comparator, and an output end of the low-pass filter is connected to the controller. The low-pass filter may filter the frequency difference signal, and output a filtered frequency difference signal to the controller. After the frequency difference signal is filtered by the low-pass filter, signal quality of the frequency difference signal can be improved, and accuracy of the controller is improved.

According to a third aspect, an embodiment of this disclosure provides an operation system. The operation system may include a power supply circuit, a logic circuit, and the voltage regulation circuit provided in the first aspect or the second aspect. For technical effects of a corresponding solution in the third aspect, refer to technical effects that may be obtained according to a corresponding solution in the first aspect. Repeated parts are not described herein again.

Generally, the operation system may further include a phase-locked loop PLL, and the PLL is connected to the logic circuit. The PLL may receive a reference clock signal, and provide a third clock signal for the logic circuit based on the reference clock signal. A frequency of the third clock signal matches an operating frequency of the logic circuit for driving the logic circuit to operate.

In a possible implementation, the power supply circuit may include a first power supply and a second power supply. The first power supply may provide a first output voltage for the voltage regulation circuit. The second power supply may provide a second output voltage for the logic circuit. A regulation circuit is separately connected to the first power supply and the second power supply. In this case, the regulation circuit may separately control, based on a first clock signal, the first power supply to regulate the first output voltage, and the second power supply to regulate the second output voltage. The first output voltage is consistent with the second output voltage.

According to a fourth aspect, an embodiment of this disclosure provides an integrated module. The integrated module may include a logic circuit and the voltage regulation circuit provided in the first aspect or the second aspect. For technical effects of a corresponding solution in the fourth aspect, refer to technical effects that may be obtained according to a corresponding solution in the first aspect. Repeated parts are not described herein again.

In a possible implementation, the integrated module may further include a phase-locked loop PLL, and the PLL is connected to the logic circuit. The PLL may receive a reference clock signal, and provide a third clock signal for the logic circuit based on the reference clock signal.

According to a fifth aspect, an embodiment of this disclosure provides an integrated circuit. The integrated circuit includes at least one operation system provided in the third aspect and a system bus, and the system bus is separately connected to the at least one operation system. In the integrated circuit, the system bus may separately provide at least one corresponding reference clock signal for the at least one operation system. For technical effects of a corresponding solution in the fifth aspect, refer to technical effects that may be obtained according to a corresponding solution in the first aspect. Repeated parts are not described herein again.

According to a sixth aspect, an embodiment of this disclosure provides a voltage regulation method. The method may be applied to the foregoing voltage regulation circuit. For technical effects of a corresponding solution in the sixth aspect, refer to technical effects that may be obtained according to a corresponding solution in the first aspect. Repeated parts are not described herein again.

For example, the method mainly includes: The voltage regulation circuit generates a first clock signal using an oscillator based on an output voltage of a power supply circuit, where a process corner type of the oscillator is the same as a process corner type of a logic circuit, and an output voltage of the power supply circuit may be used to supply power to the logic circuit; and the voltage regulation circuit further controls, based on the first clock signal, the power supply circuit to regulate the output voltage.

For example, when the voltage regulation circuit controls, based on the first clock signal, the power supply circuit to regulate the output voltage, the voltage regulation circuit may perform frequency division on the first clock signal based on a frequency division multiple to obtain a second clock signal; and control, based on a relative frequency value relationship between the second clock signal and a reference clock signal, the power supply circuit to regulate the output voltage.

A quotient obtained through division of a frequency of a first clock signal output by an oscillator of a TT corner type by a frequency of the reference clock signal is the foregoing frequency division multiple.

When the voltage regulation circuit controls the power supply circuit to regulate the output voltage based on the relative frequency value relationship between the second clock signal and the reference clock signal, the voltage regulation circuit may control the power supply circuit to decrease the output voltage when a frequency of the second clock signal is greater than the frequency of the reference clock signal; or control the power supply circuit to increase the output voltage when a frequency of the second clock signal is less than the frequency of the reference clock signal.

These aspects or other aspects of this disclosure are clearer and more comprehensible in descriptions of the following embodiments.

BRIEF DESCRIPTION OF DRAWINGS

FIG. 8 is a schematic flowchart of a voltage regulation method according to an embodiment of this disclosure.

DESCRIPTION OF EMBODIMENTS

With development of a semiconductor process towards deep submicron, logical operation speeds of semiconductor devices increase accordingly, and impact of the semiconductor process on the logical operation speeds becomes increasingly obvious. Currently, the impact of the semiconductor process on the logical operation speed is mostly represented by a process corner (corner). Based on different process corner types, the semiconductor devices may be classified into a TT corner device, an SS corner devices, and an FF corner device. At a standard temperature, the TT corner device has a standard delay and a standard logical operation speed, the SS corner device has a large delay and a slow logical operation speed, and the FF corner device has a small delay and a fast logical operation speed. The standard temperature is a normal operating temperature of a semiconductor device, and is generally 30° C.

Correspondingly, for a logic circuit, a module, a logical path, or the like that includes one or more semiconductor devices, a process corner type of the logic circuit, the module, the logical path, or the like may be classified into a TT corner, an SS corner, and an FF corner as a whole. The logic circuit is used as an example. The process corner type of the logic circuit is a feature represented by the logic circuit as a whole. Because semiconductor devices in the logic circuit are obtained using a same process condition, it may be considered that one or more semiconductor devices in the logic circuit all have a process corner type consistent with that of the logic circuit.

In an embodiment, if the process corner type of the logic circuit is the TT corner, it may be considered that the semiconductor devices in the logic circuit are all TT corner devices; if the process corner type of the logic circuit is the SS corner, it may be considered that the semiconductor devices in the logic circuit are all SS corner devices; or if the process corner type of the logic circuit is the FF corner, it may be considered that the semiconductor devices in the logic circuit are all FF corner devices.

Currently, at the standard temperature, when working timing of the logic circuit is fixed, a timing margin of a logic circuit of the TT corner type may be sufficient. Working timing of a logic circuit includes an operating frequency of the logic circuit, a frequency of a data signal, a frequency of a clock signal, and the like. However, when the working timing of the logic circuit is fixed, when the process corner type of the logic circuit is the TT corner, the timing margin of the logic circuit is sufficient. However, when the process corner type of the logic circuit is the SS corner or the FF corner, the timing margin of the logic circuit is insufficient.

Figure 1:
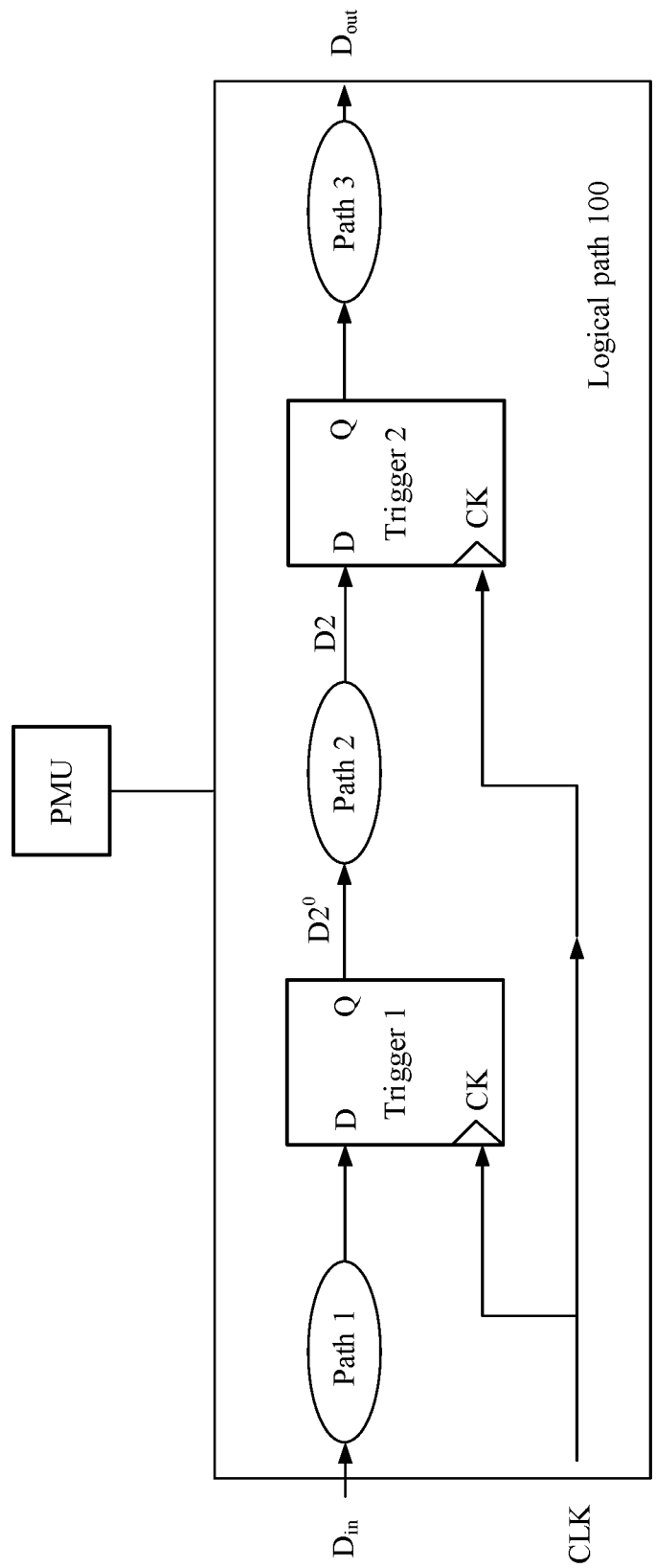
FIG. 1 is a schematic diagram of a structure of a logic circuit.

Next, FIG. 1 is used as an example to describe timing margins of logic circuits of different process corner types.

FIG. 1 is a schematic diagram of a structure of a logic circuit 100. A power management unit (power management unit, PMU) supplies power to the logic circuit 100. The logic circuit 100 mainly includes a path 1, a trigger 1, a path 2, a trigger 2, and a path 3 that are sequentially connected in series. $D_{in}$ is a data signal input to the logic circuit 100, CLK is a clock signal of the logic circuit 100, and $D_{out}$ is a data signal output by the logic circuit 100.

The path 1, the path 2, the path 3, and the like are combination logic, and each path has a specific delay. The path 2 is used as an example. The path 2 may include one or more gate circuits. A logical operation may be performed on a data signal $D2^\circ$ output by the trigger 1, and a data signal D2 obtained after the operation is performed on the data signal $D2^\circ$ is output to the trigger 2.

The trigger 2 includes a D port, a Q port, and a CK port. The D port is configured to receive the data signal D2 transmitted from the path 2, the CK port is configured to receive the clock signal CLK, and the trigger 2 may receive the data signal D2 based on the clock signal CLK, and continue to output the data signal D2 to the path 3.

Figure 2:
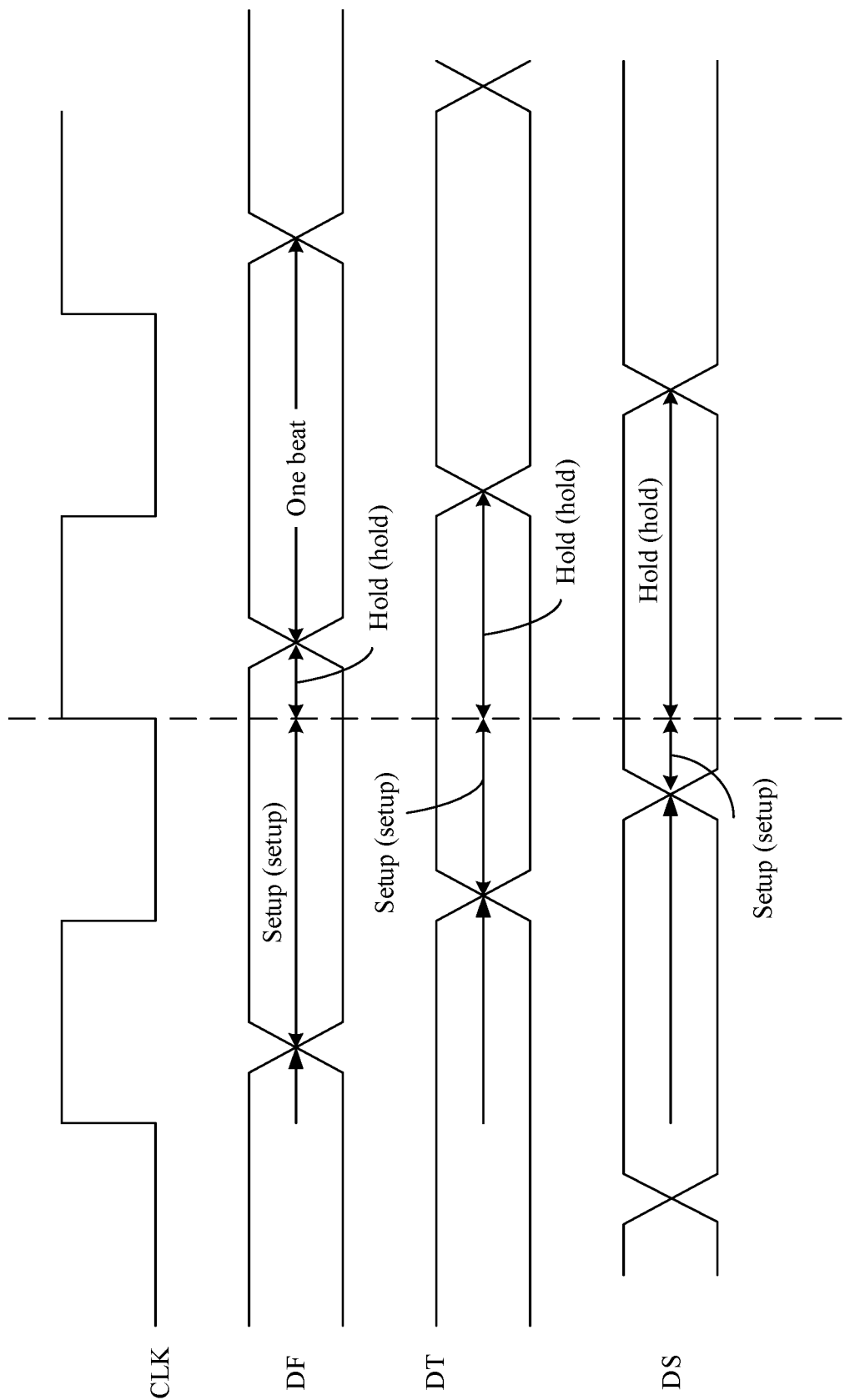
FIG. 2 is a schematic diagram of data signals in logic circuits of different process corner types.

Based on the logic circuit 100 shown in FIG. 1, FIG. 2 shows an example of a comparison diagram of a timing relationship between the data signal D2 received by the trigger 2 and the clock signal CLK in FIG. 1 when the logic circuits 100 are of different process corner types. When a process corner type of the logic circuit 100 is a TT corner, the data signal D2 received by the trigger 2 may be represented as DT. When the process corner type of the logic circuit 100 is an SS corner, the data signal D2 received by the trigger 2 may be represented as DS. When the process corner type of the logic circuit 100 is an FF corner, the data signal D2 received by the trigger 2 may be represented as DF.

It can be seen from FIG. 2 that the data signal D2 (including at least three cases: DT, DF, and DS) is a periodic signal, and one period may also be referred to as a beat. In each period, the data signal D2 may be a high-level signal or a low-level signal. The trigger 2 may receive and store an operation result of the path 2, and a time interval at which the trigger 2 continuously receives the data signal D2 twice is one beat.

Generally, each beat of data signal D2 may be divided into a setup (setup) time and a hold (hold) time. The trigger 2 is used as an example. A time point t1 in FIG. 2 is a rising edge of the clock signal CLK, namely, a time point at which the trigger 2 receives the data signal DT. In each beat of the data signal D2, the setup time may be understood as duration of the data signal D2 before a time point at which the trigger 2 starts to receive the data signal D2 (the time point t1), and the hold time of the data signal D2 may be understood as duration of the data signal D2 after the time point at which the trigger 2 starts to receive the data signal D2 (the time point t1).

When both the setup time and the hold time are long, the trigger 2 may normally receive the data signal D2 from the path 2. In this case, it may be considered that a timing margin of the path 2 is sufficient. When the setup time or the hold time is short, the trigger 2 may fail to receive the data signal D2 output by the path 2. In this case, it may be considered that the timing margin of the path 2 is insufficient.

When a process corner type of the path 2 is a TT corner, the data signal D2 output by the path 2 is the data signal DT, and the setup time and the hold time in each beat of the data signal DT are long. In this case, the timing margin of the path 2 is sufficient. Correspondingly, because process corner types of semiconductor devices in the logic circuit 100 are consistent, it may be considered that a timing margin of the logic circuit 100 of a TT corner type is also sufficient.

However, timing margins of the path 2 of an SS corner type and the path 2 of an FF corner type may be insufficient. In an embodiment, when the process corner type of the path 2 is an SS corner, the data signal D2 output by the path 2 may be the data signal DS shown in FIG. 2. It can be learned from the data signal DS that, because the path 2 has a large delay and a slow logical operation speed, a time point at which the data signal DS arrives at the trigger 2 is delayed, so that the data signal DS transmitted to the trigger 2 has a short setup time. When the setup time is excessively short, the trigger 2 may fail to normally receive the data signal DS, in other words, the timing margin of the path 2 is insufficient. In addition, the timing margin of the logic circuit 100 is mainly affected by a minimum value of a timing margin of each path. Therefore, if the timing margin of the path 2 is insufficient, the timing margin of the logic circuit 100 is also insufficient.

For example, when the process corner type of the path 2 is an FF corner, the data signal D2 output by the path 2 may be the data signal DF shown in FIG. 2. It can be learned from the data signal DF that, because the path 2 has a small delay and a fast logical operation speed, the time point at which the data signal DF arrives at the trigger 2 is advanced, so that the data signal DF transmitted to the trigger 2 has a large setup time. Consequently, a hold time of the data signal DF is short. When the hold time is excessively short, the trigger 2 may fail to normally receive the data signal DF, in other words, the timing margin of the path 2 is insufficient. As a result, the timing margin of the logic circuit 100 is also insufficient.

In conclusion, due to impact of the process corner types, the timing margin of the logic circuit may be insufficient. When the timing margin of the logic circuit is insufficient, the logic circuit may operate incorrectly, and stability of the circuit is reduced. To reduce impact of the process corner type on a timing margin, currently, static timing analysis (static timing analysis, STA) needs to be performed on working timing of a logic circuit, to ensure that the working timing can make a logic circuit of any process corner type operate normally.

In an embodiment, the STA analysis is a common means of detecting working timing of a logic circuit when the logic circuit is designed. Generally, for a logic circuit of any structure, for example, the logic circuit 100, the STA analysis may determine stability of the logic circuit 100 in working timing of the logic circuit 100 according to a sign-off (sign-off) verification criterion.

During the STA analysis, the sign-off verification criterion mainly considers impact of a process, a voltage, and a temperature (process, voltage, temperature, PVT) on the logical operation speed of the logic circuit 100. For example, the sign-off verification criterion may be shown in the following Table 1.

TABLE 1

| LT | FF, 105% VDD, −40° C. |
| Typical | TT, 100% VDD, 30° C. |
| WC | SS, 95% VDD, 125° C. |
| WCL | SS, 95% VDD, −40° C. |

As shown in Table 1, four special application scenarios are designed for the STA analysis: a low temperature (low temperature, LT) scenario, a typical (Typical) scenario, a worst case (worst case, WC) scenario, and a worst case low temperature (worst case low temperature, WCL) scenario. In an embodiment, the LT scenario may also be referred to as a best case (best case, BC) scenario.

In the LT scenario, the PMU outputs a voltage of 105% VDD, an operating temperature is −40° C., and the process corner type of the logic circuit 100 is the FF corner. VDD may be understood as a constant voltage output by the PMU, or may be understood as a rated operating voltage of the logic circuit 100. In the LT scenario, the voltage output by the PMU may fluctuate (within a range of ±5%). Therefore, the voltage output by the PMU is designed to be 105% in the LT scenario. If the logic circuit 100 can operate stably in the working timing of the logic circuit 100, in the LT scenario, although a delay of the logic circuit 100 is small, the logic circuit 100 can still operate normally.

In the typical scenario, the PMU outputs a voltage of 100% VDD, the operating temperature is 30° C. (a standard temperature), and the process corner type of the logic circuit 100 is the TT corner. If the logic circuit 100 can operate stably in the working timing of the logic circuit 100, in the typical scenario, the logic circuit 100 has a standard delay, and the logic circuit 100 can operate normally.

In the WC scenario, the PMU outputs a voltage of 95% VDD, the operating temperature is 125° C., and the process corner type of the logic circuit 100 is the SS corner. If the logic circuit 100 can operate stably in the working timing of the logic circuit 100, in the WC scenario, although the delay of the logic circuit 100 is large, the logic circuit 100 can operate normally.

In the WCL scenario, the PMU outputs a voltage of 95% VDD, the operating temperature is −40° C., and the process corner type of the logic circuit 100 is the SS corner. If the logic circuit 100 can operate stably in the working timing of the logic circuit 100, in the WCL scenario, although the delay of the logic circuit 100 is large, the logic circuit 100 can still operate normally.

When the working timing of the logic circuit 100 can meet the verification criterion shown in Table 1, it may be considered that the working timing can make the logic circuit 100 operate stably. However, when the STA analysis is used to improve stability of the logic circuit 100, it is more difficult to design the working timing. In addition, performance of the logic circuit 100 usually needs to be deteriorated to some extent, to make the working timing meet the sign-off verification criterion. For example, generally, the operating frequency of the logic circuit 100 needs to be decreased or a buffer needs to be added to the logic circuit 100, to meet the sign-off verification criterion.

In view of this, an embodiment of this disclosure provides a voltage regulation circuit. The voltage regulation circuit may control, for logic circuits of different process corner types, a power supply circuit to adaptively regulate an output voltage provided for a logic circuit, so that the output voltage of the power supply circuit can match the process corner types of the logic circuits. In other words, both a logic circuit of an SS corner type and a logic circuit of an FF corner type can represent a timing characteristic of a logic circuit of a TT corner type, namely, a standard delay. In this way, a timing margin of the logic circuit of the SS corner type and a timing margin of the logic circuit of the FF corner type are optimized.

The following describes in detail embodiments of this disclosure with reference to the accompanying drawings. To make objectives, technical solutions, and advantages of this disclosure more clearly, the following further describes this application in detail with reference to the accompanying drawings. A specific operation method in a method embodiment may also be applied to an apparatus embodiment or a system embodiment. It should be noted that in the descriptions of this disclosure, "at least one" means one or more, and "a plurality of" means two or more. In view of this, "a plurality of" may also be understood as "at least two" in embodiments of the present application. It should be understood that in the descriptions of this disclosure, terms such as "first" and "second" should not be understood as indicating or implying relative importance, or should not be understood as indicating or implying a sequence.

Figure 3:
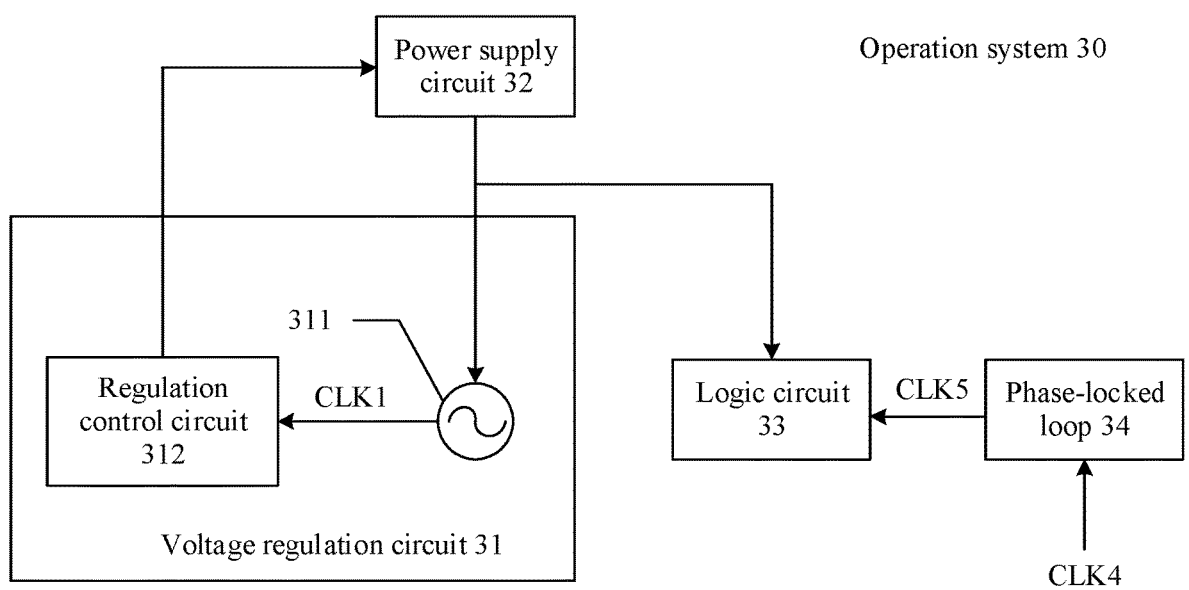
FIG. 3 is a schematic diagram of a structure of an operation system according to an embodiment of this disclosure.

FIG. 3 shows an example of an operation system according to an embodiment of this disclosure. As shown in FIG. 3, an operation system 30 mainly includes a voltage regulation circuit 31, a power supply circuit 32, and a logic circuit 33. The power supply circuit 32 is separately connected to the voltage regulation circuit 31 and the logic circuit 33.

The operation system 30 in this application has a plurality of possible implementations. For example, the voltage regulation circuit 31, the power supply circuit 32, and the logic circuit 33 may be discrete components interconnected through a metal conducting wire. For another example, the operation system 30 may also be used as a chip to integrate the voltage regulation circuit 31, the power supply circuit 32, and the logic circuit 33. For another example, the voltage regulation circuit 31 and the logic circuit 33 may be integrated into a same integrated module (or a chip), and the power supply circuit 32 is connected to the integrated module (or the chip) through a metal conducting wire. These are not enumerated one by one in an embodiment of this disclosure.

Next, the voltage regulation circuit 31, the power supply circuit 32, and the logic circuit 33 are separately further described using examples.

1. Power Supply Circuit 32

The power supply circuit 32 may supply power to the logic circuit 33. In an embodiment of this disclosure, an output voltage of the power supply circuit 32 may be regulated. In an embodiment, the power supply circuit 32 may regulate the output voltage under control of the voltage regulation circuit 31. For example, the power supply circuit 32 may receive a voltage regulation signal provided by the voltage regulation circuit 31, and regulate the output voltage of the power supply circuit 32 based on the voltage regulation signal.

For example, the voltage regulation signal provided by the voltage regulation circuit 31 may at least indicate to increase the voltage or decrease the voltage. In an embodiment of this disclosure, when the power supply circuit 32 regulates the output voltage, there are at least the following two possible implementations:

Implementation 1: The voltage regulation circuit 31 may not only control the power supply circuit 32 to increase or decrease the output voltage, but also control a voltage regulation amplitude of the power supply circuit 32. For example, the voltage regulation circuit 31 may control the power supply circuit 32 to increase the output voltage by 50 mV, may control the power supply circuit 32 to decrease the voltage by 30 mV, or the like.

Implementation 2: A rated voltage regulation amplitude is set in the power supply circuit 32. Under control of the voltage regulation circuit 31, the power supply circuit 32 may regulate the output voltage based on the rated voltage regulation amplitude. For example, if the rated voltage regulation amplitude is 50 mV, when the voltage regulation circuit 31 controls the power supply circuit 32 to increase the output voltage, the power supply circuit 32 may increase the output voltage by 50 mV based on the rated voltage regulation amplitude; and when the voltage regulation circuit 31 controls the power supply circuit 32 to decrease the output voltage, the power supply circuit 32 may decrease the output voltage by 50 mV based on the rated voltage regulation amplitude.

In an embodiment of this disclosure, the output voltage of the power supply circuit 32 may be used as an operating voltage of the logic circuit 33 to drive the logic circuit 33 to complete a logical operation. In a possible implementation, an initial output voltage of the power supply circuit 32 may be set based on a rated operating frequency of the logic circuit 33. In an embodiment, the output voltage of the power supply circuit 32 affects the operating frequency of the logic circuit 33. When other factors remain unchanged, a larger output voltage of the power supply circuit 32 indicates a higher operating frequency of the logic circuit 33 and a faster logical operation speed of the logic circuit 33. On the contrary, a smaller output voltage of the power supply circuit 32 indicates a lower operating frequency of the logic circuit 33 and a slower logical operation speed of the logic circuit 33.

In an embodiment of this disclosure, the initial output voltage may be configured for the power supply circuit 32 based on the rated operating frequency of the logic circuit 33, so that for a logic circuit 33 of a TT corner type, the output voltage of the power supply circuit 32 can match the logic circuit 33 as soon as possible. For a logic circuit 33 of an SS corner type and a logic circuit 33 of an FF corner type, the output voltage of the power supply circuit 32 may match the logic circuit 33 through voltage regulation for a small quantity of times based on the initial output voltage.

2. Logic Circuit 33

The logic circuit 33 may be a circuit having a logical operation function, and may be a digital circuit or an analog circuit. A specific function and a circuit structure of the logic circuit 33 are not much limited in an embodiment of this disclosure. For example, the logic circuit 33 may be a digital circuit that has a logical operation function and that is in a digital chip, for example, a central processing unit (central processing unit, CPU) or a graphics processing unit (graphics processing unit, GPU). The logic circuit 33 may implement at least one complete logical operation function by processing a data signal.

Alternatively, the logic circuit 33 may be an analog circuit that is in an analog chip and that processes an analog signal, for example, a successive approximation register analog-to-digital converter (successive approximation register analog-to-digital converter, SAR ADC) or a serializer-deserializer (serializer-deserializer, SERDES). These are not enumerated one by one in an embodiment of this disclosure. For ease of description, the following uses the digital circuit as an example to describe the logic circuit 33 in an embodiment of this disclosure.

The logic circuit 33 may include one or more logical paths, each logical path may include one or more gate circuits, and each gate circuit may further include one or more semiconductor devices. Due to a manufacturing process of semiconductor devices, a process corner type represented by the logic circuit 33 as a whole may be an SS corner, a TT corner, or an FF corner.

3. Voltage Regulation Circuit 31

In an embodiment of this disclosure, the voltage regulation circuit 31 may control the power supply circuit 32 to regulate the output voltage for the logic circuits 33 of different process corner types. In an embodiment, when the logic circuit 33 is of the SS corner type, the voltage regulation circuit 31 may control the power supply circuit 32 to increase the output voltage, and the logical operation speed of the logic circuit 33 increases as the output voltage of the power supply circuit 32 increases, so that a setup time of a data signal in the logic circuit 33 is prolonged, and a timing margin of the logic circuit 33 is optimized.

When the logic circuit 33 is of the FF corner type, the voltage regulation circuit 31 may control the power supply circuit 32 to decrease the output voltage, and the logical operation speed of the logic circuit 33 decreases as the output voltage of the power supply circuit 32 decreases, so that a setup time of a data signal in the logic circuit 33 is shortened, a hold time is correspondingly prolonged, and a timing margin of the logic circuit 33 is optimized.

For example, as shown in FIG. 3, the voltage regulation circuit 31 provided in an embodiment of this disclosure mainly includes an oscillator 311 and a regulation circuit 312. An input end of the oscillator 311 is connected to the power supply circuit 32, an output end of the oscillator 311 is connected to an input end of the regulation circuit 312, and an output end of the regulation circuit 312 is connected to the power supply circuit 32. An arrow in FIG. 3 may represent a transmission direction of a signal.

In an embodiment of this disclosure, the oscillator 311 may be a voltage-controlled oscillator. In other words, a frequency of a clock signal CLK1 output by the oscillator 311 is mainly controlled by the output voltage of the power supply circuit 32. The oscillator 311 may generate the clock signal CLK1 based on the output voltage of the power supply circuit 32, and the oscillator 311 has a same process corner type as that of the logic circuit 33. In a possible implementation, the oscillator 311 and the logic circuit 33 may be integrated into a same chip, and the oscillator 311 and the logic circuit 33 may be manufactured using a same batch of production processes. Therefore, it may be considered that the oscillator 311 and the logic circuit 33 have the same process corner type.

It may be understood that the process corner type of the oscillator 311 also affects the clock signal CLK1. When factors other than the process corner type are the same, clock signals CLK1 output by oscillators 311 of different process corner types are slightly different. Other common factors mainly include the output voltage of the power supply circuit 32, a circuit structure of the oscillator 311, a temperature, and the like.

For example, when the other factors are the same, the oscillator 311 of the TT corner type may output a clock signal CLK1 of a standard frequency; the oscillator 311 of the SS corner type outputs a clock signal CLK1 of a low frequency; and the oscillator 311 of the FF corner type outputs a clock signal CLK1 of a high frequency.

Therefore, the regulation circuit 312 may distinguish the logic circuits 33 of the different process corner types based on the clock signals CLK1, and further control the power supply circuit 32 to adaptively regulate the output voltage. For example, when the frequency of the clock signal CLK1 is low, it indicates that the logic circuit 33 is of the SS corner type. The regulation circuit 312 may control the power supply circuit 32 to increase the output voltage, so that the logical operation speed of the logic circuit is increased, and the timing margin of the logic circuit is optimized.

For another example, when the frequency of the clock signal CLK1 is high, it indicates that the logic circuit 33 is of the FF corner type. The regulation circuit 312 may control the power supply circuit 32 to decrease the output voltage, so that the logical operation speed of the logic circuit is decreased, and the timing margin of the logic circuit is optimized.

In addition, currently, when working timing of the logic circuits 33 is designed, to increase the timing margins of the logic circuit of the SS corner type and the logic circuit of the FF corner type, operating frequencies of the logic circuits 33 usually need to be decreased, to prolong setup times or hold times. In other words, current operating frequencies of the logic circuits 33 usually cannot reach their rated operating frequencies. However, when the voltage regulation circuit 31 provided in an embodiment of this disclosure is used, the logic circuit 33 can represent a timing characteristic of the logic circuit of the TT corner type, and the operating frequency of the logic circuit 33 does not need to be decreased. In this way, the logical operation speed of the logic circuit 33 is increased.

In addition, currently, when the working timing of the logic circuits 33 is designed, the output voltage of the power supply circuit 32 remains unchanged, and the logic circuits 33 of the different process corner types and different operating frequencies all operate at a same voltage. Therefore, the power supply circuit 32 need to reserve a specific voltage margin. Especially when the logic circuit is of the FF corner type, the output voltage of the power supply circuit 32 is wasted to a great extent. However, in an embodiment of this disclosure, the voltage regulation circuit 31 matches the output voltage of the power supply circuit 32 for the logic circuit 33, and the voltage margin does not need to be reserved. Therefore, this helps further reduce power consumption of the logic circuit 33.

Next, the oscillator 311 and the regulation circuit 312 are separately further described using examples.

(1) Oscillator 311

In an embodiment of this disclosure, the oscillator 311 may be a voltage-controlled oscillator (voltage-controlled oscillator, VCO) of any structure. This is not much limited in an embodiment of this disclosure.

In a possible implementation, the oscillator 311 may include a first path, and the oscillator 311 may generate the clock signal CLK1 through the first path based on the output voltage of the power supply circuit 32. When the output voltage of the power supply circuit 32 remains unchanged, when a process corner type of the first path is an SS corner, the first path has a large delay, so that the clock signal CLK1 has a large period and a low frequency; and when the process corner type of the first path is an FF corner, the first path has a small delay, so that the clock signal CLK1 has a small period and a high frequency.

In an embodiment of this disclosure, the first path in the oscillator 311 may match a second path in the logic circuit 33, or it may be understood that a delay of the first path is positively correlated with a delay of the second path in the logic circuit 33. It may be understood that when the delay of the second path is large, the delay of the first path is large accordingly; and when the delay of the second path is small, the delay of the first path is small accordingly.

In a possible implementation, the second path may be any logical path in the logic circuit 33. This is not much limited in an embodiment of this disclosure. Because process corner types of the first path and the second path are the same, the delays of the first path and the second path may remain positively correlated.

In another possible implementation, the second path may also be a logical path with a critical timing margin in the logic circuit 33; or the second path may be referred to as a critical timing path or a timing critical path.

It may be understood that, when the second path cannot operate normally due to an excessively small timing margin, the logic circuit 33 cannot operate normally due to an overall insufficient timing margin. When the timing margin of the critical timing path is sufficient, a timing margin of another critical timing path is also sufficient. Therefore, the logic circuit 33 has an overall sufficient timing margin, and can operate normally. In other words, whether the timing margin of the second path can meet a requirement of normal operation determines whether the overall timing margin of the logic circuit 33 can meet the requirement of normal operation.

In view of this, in a possible implementation, the delay of the first path may further maintain a linear positive correlation with the delay of the second path, in other words, the delay of the first path and the delay of the second path may maintain an equal proportional relationship. Further, the proportional relationship may be 1:1, in other words, the delay of the first path may also be equal to the delay of the second path. When the delay of the first path and the delay of the second path maintains the equal proportional relationship, a change degree of the delay the first path may be consistent with a change degree of the delay of the second path.

For example, a process corner type of the second path is an SS corner, and a current delay of the second path is 80 ns. The delay of the first path is equal to the delay of the second path. Therefore, a current delay of the first path is 80 ns. After the regulation circuit 312 controls the power supply circuit 32 to increase the output voltage, the delay of the second path is decreased to 60 ns, and the delay of the first path is also decreased to 60 ns synchronously.

In this implementation, in the logic circuit 33 of the SS corner type and the logic circuit 33 of the FF corner type, the second path (the critical timing path) can represent the timing characteristic of the logic circuit of the TT corner type. The timing margin of the second path determines whether the logic circuit 33 can operate normally as a whole. Therefore, that the first path is linearly positively correlated with the second path helps optimize the timing margin of the logic circuit 33 to a maximum extent and improve stability of the logic circuit 33.

For example, in an embodiment of this disclosure, the first path may include a plurality of serially-connected first gate circuits, and each first gate circuit generates a specific delay. Delays of the plurality of serially-connected first gate circuits are accumulated, so that the delay of the first path is linearly positively correlated with the delay of the second path. For example, if the second path includes 20 serially-connected second gate circuits, 20 serially-connected first gate circuits may also be disposed in the first path.

In a possible implementation, the first path may have a circuit structure same as or similar to that of the second path. Each first gate circuit in the first path corresponds to at least one second gate circuit in the second path, a function type of the first gate circuit is the same as a function type of the corresponding at least one second gate circuit, and a threshold voltage type of the first gate circuit is the same as a threshold voltage type of the corresponding at least one second gate circuit. In other words, a type of a first gate circuit in the first path may further match a type of a second gate circuit in the second path. In an embodiment, the first path may include a plurality of first gate circuits, the second path may also include a plurality of second gate circuits, and the plurality of second gate circuits may have a same or different function types and threshold voltage types. For any first gate circuit in the first path, there are one or more second gate circuits corresponding to the first gate circuit in the second path. The first gate circuit and the corresponding second gate circuit have the same function type and the same threshold voltage type.

Function types of the gate circuits are classified based on standard cells (standard cell). Generally, the gate circuits may be classified into an AND gate circuit, an OR gate circuit, a NOT gate circuit, and the like. Threshold voltage types of the gate circuits may be classified into at least the following types: an ultra-high threshold voltage (ultra-high threshold voltage, uhvt), a high threshold voltage (high threshold voltage, hvt), a standard threshold voltage (standard threshold voltage, svt), a low threshold voltage (low threshold voltage, lvt), or an ultra-low threshold voltage (ultra-low threshold voltage, ulvt).

For example, if an AND gate circuit in the second path is of a high threshold voltage type, an AND gate circuit in the first path is also of the high threshold voltage type. In this implementation, a more accurate linear positive correlation relationship can be maintained between the delay of the first path and the delay of the second path. This helps further improve optimization effect of the timing margin of the logic circuit 33.

It should be noted that, from a perspective of phase changes of an input signal and an output signal of a gate circuit, first gate circuits of different function types may be equivalent to one or more phase inverters. For example, if one input end of an AND gate circuit is connected to a high-level voltage, the AND gate circuit may be equivalent to two inverters. For another example, if one input end of a NAND gate circuit is connected to a high-level voltage, the NAND gate circuit may be equivalent to one inverter.

In the oscillator 311, the first path needs to include an odd number of phase inverters or be equivalent to an odd number of phase inverters to operate normally. In view of this, if the plurality of first gate circuits in the first path are equivalent to an even number of phase inverters in total, a supplementary inverter may be additionally added for the first path, so that the oscillator 311 can operate normally.

To make the voltage regulation circuit 31 provided in an embodiment of this disclosure adapt to logic circuits 33 in a plurality of scenarios, in another possible implementation, the oscillator 311 in an embodiment of this disclosure may be provided with a plurality of gate circuits, and the oscillator 311 may further configure the plurality of gate circuits as the gate circuits in the first path based on received configuration information. In an embodiment, the gate circuit in the first path may also be referred to as a first gate circuit, and the plurality of first gate circuits in the first path may be all the gate circuits in the oscillator 311, or may be one part of the gate circuits in the oscillator 311.

The oscillator 311 flexibly configures the plurality of first gate circuits in the first path based on the configuration information, so that the delay of the first path can be flexibly adjusted. Therefore, even if a structure of the second path in the logic circuit 33 changes in different scenarios, a quantity or types of the first gate circuits in the first path can be adjusted based on the configuration information, so that the oscillator 311 can maintain matching (the linear positive correlation) between the first path and the second path, and the voltage regulation circuit 31 can adapt to the logic circuits 33 in the plurality of scenarios.

For example, in an embodiment of this disclosure, the first path has at least the following two possible structures.
Structure 1

Figure 4:
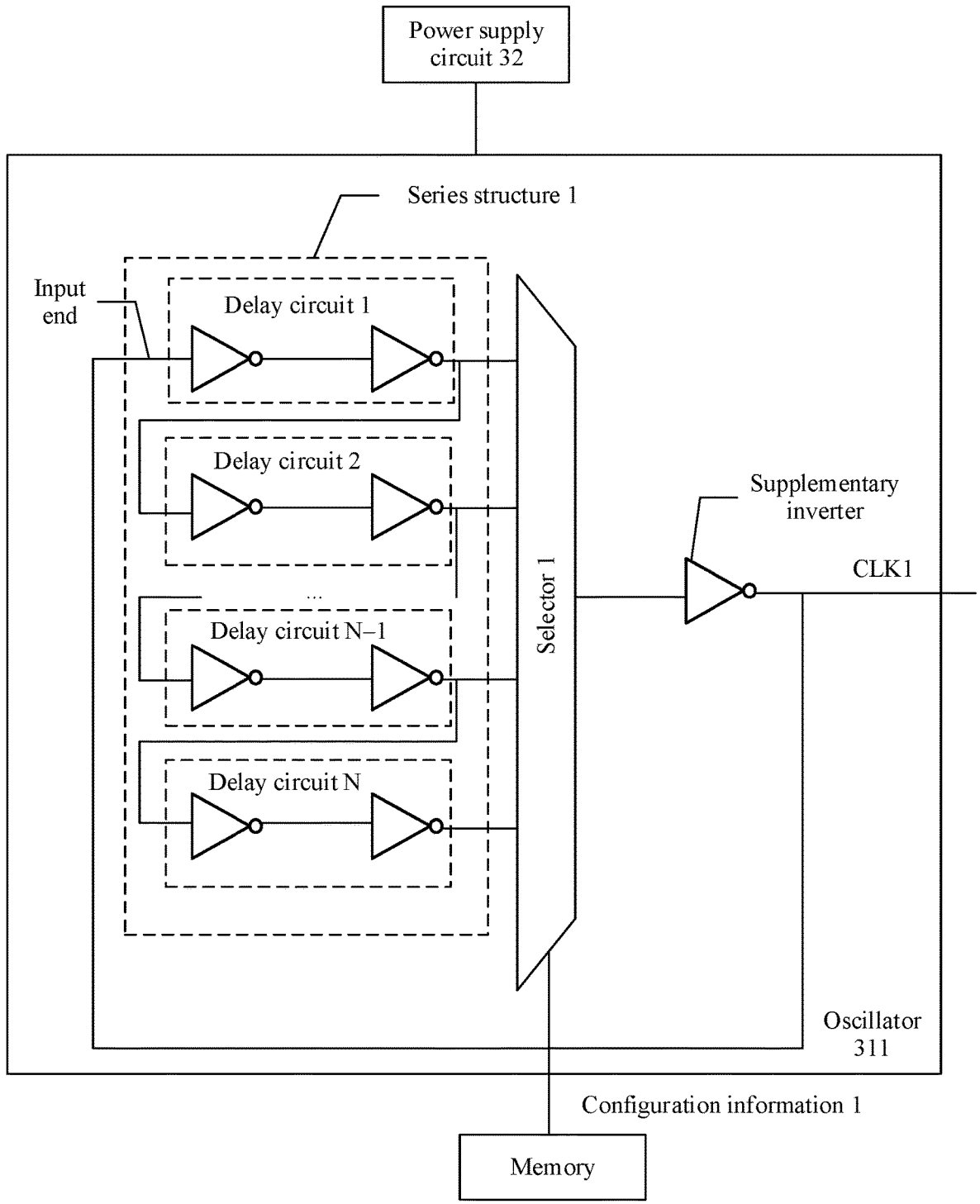
FIG. 4 is a first schematic diagram of a structure of a first path according to an embodiment of this disclosure.

For example, FIG. 4 is a schematic diagram of a structure of the first path according to an embodiment of this disclosure. As shown in FIG. 4, the oscillator includes a series structure 1, a selector 1, and a supplementary inverter. The plurality of gate circuits in the oscillator 311 form the series structure 1. The series structure 1 may further include a plurality of delay circuits (delay circuits 1 to N, where N is an integer greater than 1). Each delay circuit includes one or more gate circuits, and output ends of the delay circuits 1 to N are all connected to data input ends of the selector 1. An input end of the series structure 1 is connected to an output end of the supplementary inverter, so that a feedback loop of the clock signal CLK1 can be formed. An output end of the selector 1 is connected to an input end of the supplementary inverter, and the output end of the supplementary inverter may output the clock signal CLK1.

As shown in FIG. 4, a control end of the selector 1 may further receive configuration information 1. The selector 1 may output a first intermediate signal based on the configuration information 1, where the configuration information 1 may indicate a target delay circuit in the delay circuits 1 to N, and the first intermediate signal may be an output signal of the target delay circuit. For example, the selector 1 may be a data selector, or may be a multiplexer (multiplexer, MUX). One input end may be selected from the plurality of input ends of the selector 1, and a path between the input end and the output end is connected. For example, if the configuration information 1 indicates that a delay circuit 4 is the target delay circuit, the selector 1 may connect an output path of the delay circuit 4, in other words, output an output signal of the delay circuit 4 to the supplementary inverter.

It may be understood that gate circuits between the input end of the series structure 1 and an output end of the target delay circuit may be used as the plurality of first gate circuits of the first path. For example, if the configuration information 1 indicates that the delay circuit 4 is the target delay circuit, a feedback signal of the clock signal CLK1 is output by the selector 1 after being sequentially transmitted by the delay circuits 1 to 4. In other words, only gate circuits in the delay circuits 1 to 4 further affect the delay of the first path. Therefore, the gate circuits in the delay circuits 1 to 4 may be used as the first gate circuits of the first path.

The supplementary inverter in the first path may receive the first intermediate signal output by the selector 1, and output the clock signal CLK1 based on the first intermediate signal.

In an embodiment of this disclosure, an input signal and an output signal of each delay circuit in the series structure 1 have a same phase. In other words, from a perspective of a phase change, each delay circuit may be equivalent to an even number of phase inverters. In this case, when any one of the delay circuits 1 to N is the target delay circuit, all the first gate circuits in the first path may be equivalent to an even number of phase inverters. In addition, due to the supplementary inverter, an odd number of inverters may be always maintained in an oscillation loop of the oscillator 311, to ensure implementation of a function of the oscillator.

It should be pointed out that there is a large quantity of gate circuits in a complex logical path. In an embodiment of this disclosure, adding one supplementary inverter does not significantly affect delay matching between the first path and the second path. In addition, when the second path is equivalent to an odd number of gate circuits, the supplementary inverter may also be considered as one first gate circuit.

In an embodiment of this disclosure, all the plurality of gate circuits in the oscillator 311 may be connected to the power supply circuit 32, and the power supply circuit 32 supplies power to the plurality of gate circuits. A change of the output voltage of the power supply circuit 32 causes a delay change of each gate circuit, and further causes an entire delay change of the first path, so that the frequency of the clock signal CLK1 output by the oscillator 311 also changes accordingly.

It should be noted that the configuration information in an embodiment of this disclosure may be obtained based on a circuit structure of the second path. For example, when the logic circuit 33 is designed, research and development personnel may perform critical timing analysis on the logic circuit 33, to determine a critical timing path in the logic circuit 33 as the second path. Further, the configuration information 1 may be obtained based on the circuit structure of the second path.

The oscillator shown in FIG. 4 is used as an example. If the plurality of gate circuits in the oscillator shown in FIG. 4 are all phase inverters, the oscillator shown in FIG. 4 may adapt to a second path including a plurality of serially-connected phase inverters. For example, the second path includes 10 serially-connected phase inverters, and each delay circuit in the series structure 1 includes two phase inverters. In this case, the configuration information 1 may indicate that a delay circuit 5 is the target delay circuit, and the selector 1 may receive and output an output signal of the delay circuit 5. In this case, the 10 phase inverters between an input end of the delay circuit 1 and an output end of the delay circuit 5 are used as the first gate circuits in the first path, so that the delay of the first path can match the delay of the second path.

For example, the configuration information 1 may be stored in a memory of an electronic device, and the memory may be connected to the oscillator 311 through a system bus. After being powered on, the voltage regulation circuit 31 may further obtain the configuration information 1 from the memory through the system bus, and further configure, based on the configuration information 1, the 10 phase inverters between the input end of the delay circuit 1 and the output end of the delay circuit 5 as the first gate circuits in the first path.

Each inverter in FIG. 4 is connected to the power supply circuit 32 (briefly marked in the figure). When the output voltage of the power supply circuit 32 remains unchanged, a delay of an inverter of an SS corner type (a process corner type of the inverter is the same as that of the oscillator 311 and the logic circuit 33) is large. Consequently, the delay of the first path is large, and the frequency of the clock signal CLK1 is low. A delay of a phase inverter of an FF corner type is small. Consequently, the delay of the first path is small, and the frequency of the clock signal CLK1 is high.

Therefore, the regulation circuit 312 may control, based on the frequency of the clock signal CLK1, the power supply circuit 32 to regulate the output voltage. For example, for the logic circuit 33 of the FF corner type, the inverter in the oscillator 311 is also of the FF corner type, so that the frequency of the clock signal CLK1 is high. The regulation circuit 312 may control the power supply circuit 32 to decrease the output voltage. Because the output voltage of the power supply circuit 32 may further supply power to the inverters in the oscillator 311, decreasing the output voltage of the power supply circuit 32 may prolong a delay of each inverter in the oscillator 311, further increase the delay of the first path, and decrease the frequency of the clock signal CLK1. In this way, the frequency of the clock signal CLK1 gradually approaches that of a clock signal CLK1 output by the oscillator 311 of the TT corner type.

Structure 2

Based on implementation 1, a quantity of series structures and a quantity of selectors in the first path may be further increased. Different series structures may include gate circuits of different types, loads of different sizes, and the like, to further expand a range of logic circuits 33 to which the oscillator 311 can be applied.

Figure 5:
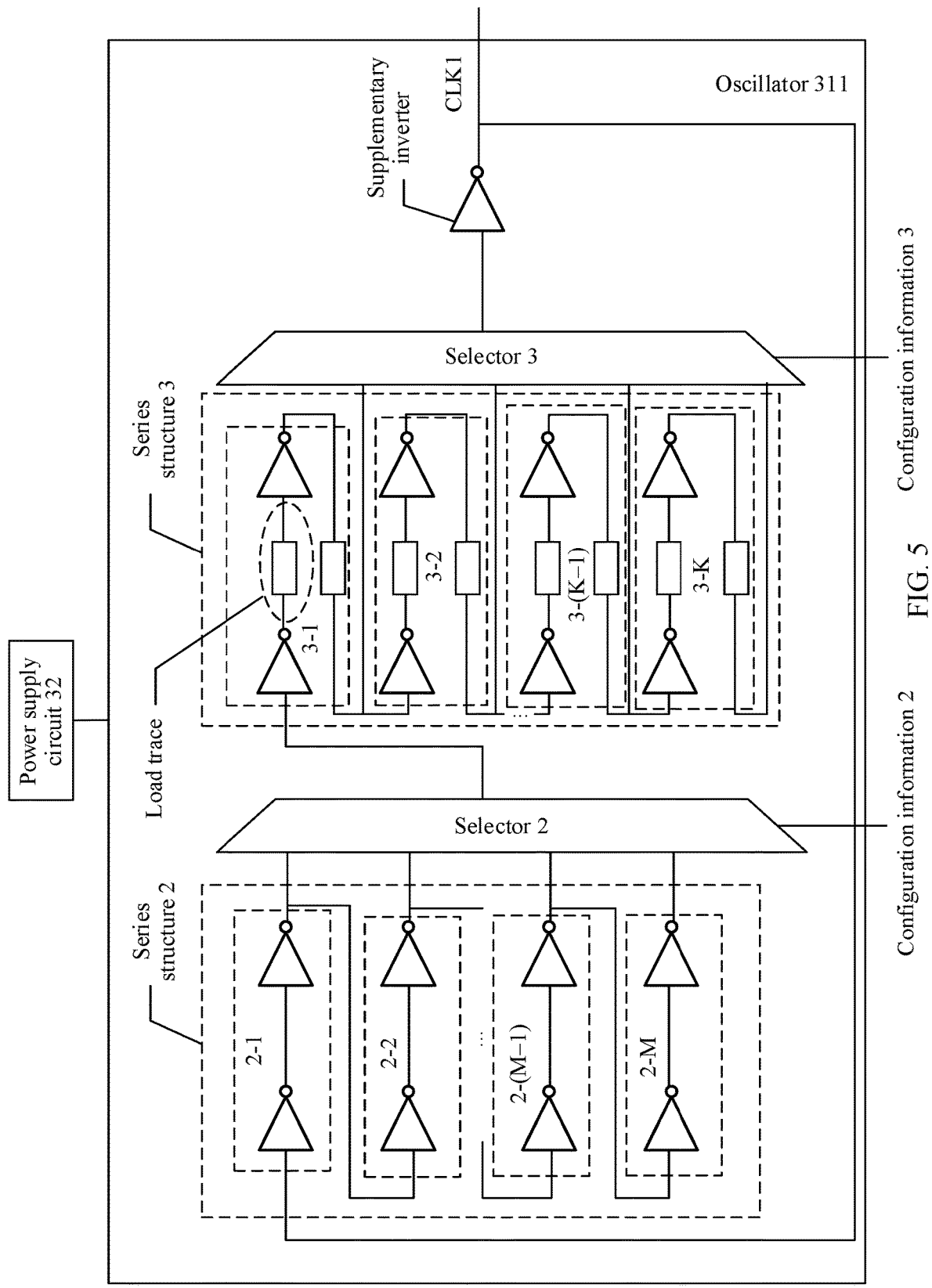
FIG. 5 is a second schematic diagram of a structure of a first path according to an embodiment of this disclosure.

For example, as shown in FIG. 5, one part of the plurality of gate circuits of the oscillator 311 forms a series structure 2, and the other part of the gate circuits forms a series structure 3. The oscillator 311 further includes a selector 2, a selector 3, and a supplementary inverter. The series structure 2 may include a plurality of low-load delay circuits (2-1 to 2-M, where M is an integer greater than 1). Each low-load delay circuit includes one or more gate circuits, an output end of each low-load delay circuit is connected to a data input end of the selector 2, and an input end of the series structure 2 is connected to an output end of the supplementary inverter, to form the feedback loop of the clock signal CLK1.

The series structure 3 may include a plurality of high-load delay circuits (3-1 to 3-K, where K is an integer greater than 1). Each high-load delay circuit includes one or more gate circuits, an output end of each high-load delay circuit is connected to a data input end of the selector 3, and an input end of the series structure 3 is connected to an output end of the selector 2. Compared with a low-load delay circuit, a high-load delay circuit has a higher load, and therefore also generates a larger delay.

A control end of the selector 2 may receive configuration information 2, the selector 2 may output a second intermediate signal based on the configuration information 2, the configuration signal 2 may indicate a target low-load delay circuit in the low-load delay circuits 2-1 to 2-M, and the second intermediate signal may be an output signal of the target low-load delay circuit. For example, if the configuration information 2 indicates that a low-load delay circuit 2-3 is the target low-load delay circuit, the selector 2 may output an output signal of the low-load delay circuit 2-3 as the second intermediate signal. In this case, all gate circuits in the low-load delay circuits 2-1 to 2-3 may be used as the one part of the plurality first gate circuits of the first path.

A control end of the selector 3 may receive configuration information 3, the selector 3 may output a third intermediate signal based on the configuration information 3, the configuration information 3 may indicate a target high-load delay circuit in the high-load delay circuits 3-1 to 3-K, and the third intermediate signal may be an output signal of the target high-load delay circuit. For example, if the configuration information 3 indicates that a high-load delay circuit 3-4 is the target high-load delay circuit, the selector 3 may output an output signal of the high-load delay circuit 3-4 as the third intermediate signal. In this case, all gate circuits in the high-load delay circuits 3-1 to 3-4 may be used as the other part of the plurality first gate circuits of the first path.

The supplementary inverter may receive the third intermediate signal, and output the first clock signal based on the third intermediate signal. In an embodiment of this disclosure, an input signal and an output signal of the low-load delay circuit have a same phase. Therefore, from the perspective of the phase change, the low-load delay circuit may be equivalent to an even number of phase inverters. This also applies to the high-load delay circuit.

In this case, similar to implementation 1, due to the supplementary inverter, when any low-load delay circuit is configured as the target low-load delay circuit and any high-load delay circuit is configured as the target high-load delay circuit, the oscillation loop of the oscillator 311 can be kept equivalent to an odd number of gate circuits.

For example, the high-load delay circuit in an embodiment of this disclosure may further include at least one load routing. The load routing may be understood as a connection line connected in series with a load, or may be understood as a connection line whose trace length reaches a specific threshold. For example, in the logic circuit 33, for consideration of aspects such as a line layout, lengths of traces in some part of the logical path are excessively long. Consequently, load is large and a delay of the logical path is increased. In view of this, in an embodiment of this disclosure, a quantity of low-load delay circuits and a quantity of high-load delay circuits may be flexibly configured based on a load status of the second path in the logic circuit 33, to maintain delay matching between the first path and the second path.

For example, the second path includes 10 serially-connected phase inverters and four load routings. In the oscillator 311 shown in FIG. 5, each low-load delay circuit includes two phase inverters, and each high-load delay circuit includes two phase inverters and two load routings. In this case, the configuration information 2 may indicate that the low-load delay circuit 2-3 is the target low-load delay circuit, and the high-load delay circuit 3-2 is the target high-load delay circuit. In this way, the plurality of first gate circuits in the first path include six phase inverters in the low-load delay circuits 2-1 to 2-3, and four phase inverters in the high-load delay circuits 3-1 and 3-2. In addition to the foregoing 10 first gate circuits, the first path may further include four load routings in the high-load delay circuits 3-1 and 3-2, so that the delay of the first path matches the delay of the second path.

A manner of obtaining the configuration information 2 and the configuration information 3 is similar to that of obtaining the configuration information 1, and details are not described again.

(2) Regulation Circuit 312

The regulation circuit 312 provided in an embodiment of this disclosure can control, based on the clock signal CLK1 provided by the oscillator 311, the power supply circuit 32 to regulate the output voltage. In a possible implementation, the regulation circuit 312 may be a processor, and implement the foregoing functions by running a program.

Figure 6:
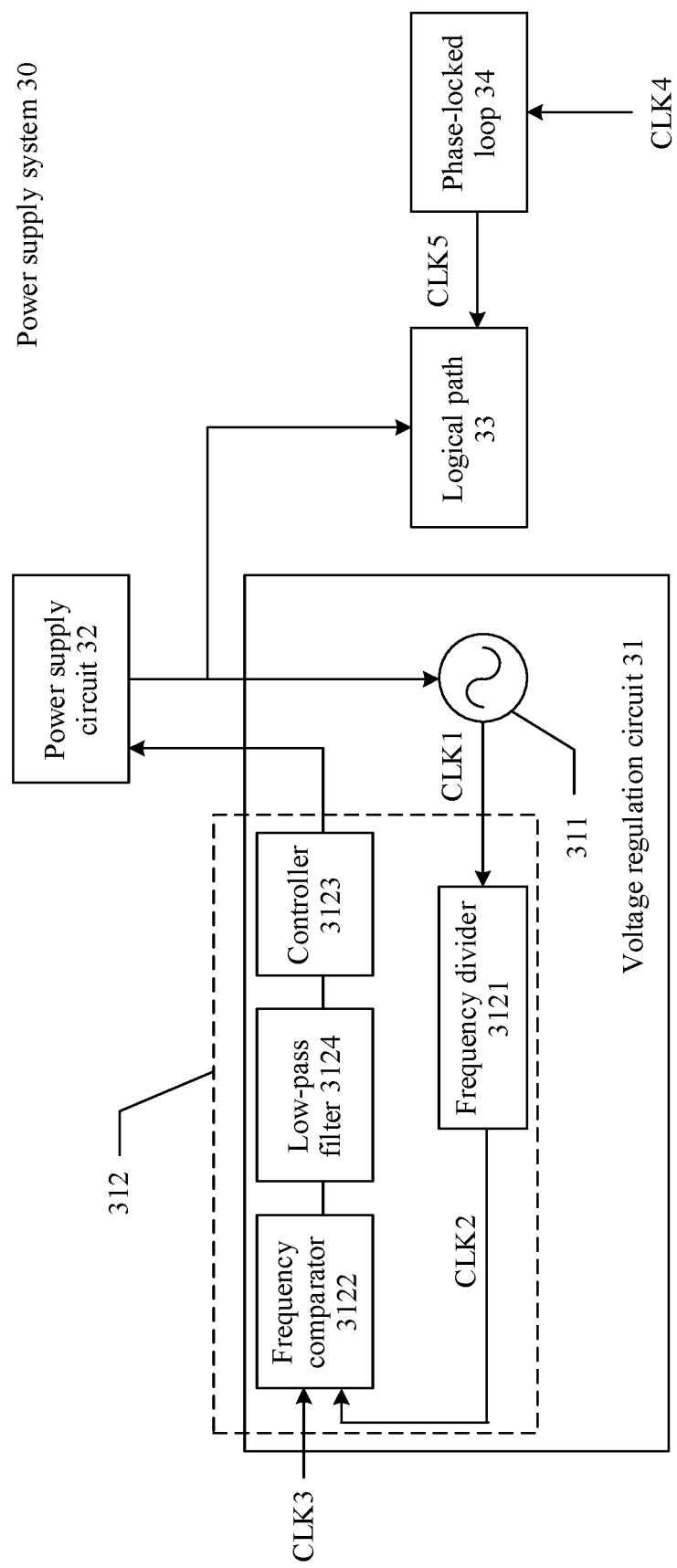
FIG. 6 is a schematic diagram of a structure of a specific voltage regulation circuit according to an embodiment of this disclosure.

In another possible implementation, for example, as shown in FIG. 6, the regulation circuit 312 may include a frequency divider 3121, a frequency comparator 3122, and a controller 3123. The frequency divider 3121 is separately connected to the oscillator 311 and the frequency comparator 3122, the frequency comparator 3122 is connected to the controller 3123, and the controller 3123 is connected to the power supply circuit 32.

The frequency divider 3121 may perform frequency division on the clock signal CLK1 based on a frequency division multiple to obtain a clock signal CLK2. For example, if the frequency of the clock signal CLK1 is 1000 Hz and the frequency division multiple is 25, a frequency of the clock signal CLK2 obtained after frequency division performed by the frequency divider 3121 on the clock signal CLK1 is 40 Hz.

In an embodiment of this disclosure, the frequency divider 3121 may be a frequency divider that supports setting of a frequency division multiple, for example, a feedback divider (feedback divider, FBDIV). This is not much limited in an embodiment of this disclosure.

The frequency comparator 3122 may receive a clock signal CLK3, and use the clock signal CLK3 as a reference clock signal. The frequency comparator 3122 may output a frequency difference signal based on the clock signal CLK3 and the clock signal CLK2, where the frequency difference signal may indicate a relative frequency value relationship between the clock signal CLK2 and the clock signal CLK3. Further, the controller 3123 may control, based on the frequency difference signal, the power supply circuit 32 to regulate the output voltage.

Generally, the clock signal CLK3 may be a clock signal generated by a crystal oscillator in the electronic device, and the clock signal CLK3 is transmitted to the frequency comparator 3122 through the system bus. For example, the frequency comparator 3122 may be an electronic component having a frequency comparison function, for example, a time-to-digital converter (time-to-digital converter, TDC). This is not much limited in an embodiment of this disclosure.

In a possible implementation, the frequency difference signal may indicate only the relative frequency value relationship between the clock signal CLK2 and the clock signal CLK3. For example, when the frequency difference signal carries "1", it indicates that the frequency of the clock signal CLK2 is greater than a frequency of the clock signal CLK3; and when the frequency difference signal carries "0", it indicates that the frequency of the clock signal CLK2 is less than the frequency of the clock signal CLK3.

In view of this, the controller 3123 may control the power supply circuit 32 to decrease the output voltage when the frequency difference signal indicates that the frequency of the clock signal CLK2 is greater than the frequency of the clock signal CLK3; or control the power supply circuit 32 to increase the output voltage when the frequency difference signal indicates that the frequency of the clock signal CLK2 is less than the frequency of the clock signal CLK3.

In an embodiment in an embodiment of this disclosure, when the process corner type of the oscillator 311 is the TT corner, after the initial output voltage (the initial output voltage is mainly determined by the operating frequency of the logic circuit 33) of the power supply circuit 32 is provided for the oscillator 311, the oscillator 311 of the TT corner type may generate the frequency of the clock signal CLK1 based on the initial output voltage, and the frequency may be considered as a standard frequency. In this case, after the frequency divider 3121 performs frequency division on the clock signal CLK1 of the standard frequency, the obtained clock signal CLK2 is a frequency division output of the clock signal CLK1 of the standard frequency. The frequency of the clock signal CLK3 is configured as a frequency of the frequency division output. It should be noted that the foregoing configuration is implemented when the standard temperature is considered, where the standard temperature may be generally 30° C.

When the frequency of the clock signal CLK2 is greater than the frequency of the clock signal CLK3, it indicates that the delay of the oscillator 311 is small, and the process corner types of the oscillator 311 and the logic circuit 33 each are the FF corner. In this case, the controller 3123 may send a voltage decrease signal to the power supply circuit 32, so that the power supply circuit 32 decreases the output voltage. Therefore, the delay of the oscillator 311 and the delay of the logic circuit 33 are prolonged, and the frequencies of the clock signal CLK1 and the clock signal CLK2 are decreased. The controller 3123 may send the voltage decrease signal to the power supply circuit 32 for a plurality of times until the frequency of the clock signal CLK2 decreases to the frequency of the clock signal CLK3.

When the frequency of the clock signal CLK2 is less than the frequency of the clock signal CLK3, it indicates that the delay of the oscillator 311 is large, and the process corner types of the oscillator 311 and the logic circuit 33 each are the SS corner. In this case, the controller 3123 may control the power supply circuit 32 to increase the output voltage. Therefore, the delay of the oscillator 311 and the delay of the logic circuit 33 are shortened, and the frequencies of the clock signal CLK1 and the clock signal CLK2 are increased. The controller 3123 may control the power supply circuit 32 for a plurality of times to increase the output voltage until the frequency of the clock signal CLK2 is increased to the frequency of the clock signal CLK3.

For example, after regulation is performed by the voltage regulation circuit 31, effect shown in Table 2 may be achieved.

TABLE 2

| Process corner | Temperature | Setup time/hold time | Output voltage |
|---|---|---|---|
| FF | 125° C. | 0.5 ns/0.5 ns | 0.96 V |
| FF | −40° C. | 0.5 ns/0.5 ns | 0.93 V |
| TT | 30° C. | 0.5 ns/0.5 ns | 1 V |
| SS | −40° C. | 0.5 ns/0.5 ns | 1.06 V |
| SS | 125° C. | 0.5 ns/0.5 ns | 1.04 V |

As shown in Table 2, the operating frequency of the logic circuit 33 is 1 GHz, and duration of one period of a data signal received by the logic circuit 33 is 1 ns. For the logic circuit 33 of the FF corner type, at a temperature of 125° C., the voltage regulation circuit 31 provided in an embodiment of this disclosure may regulate the output voltage of the power supply circuit 32 to 0.96 V, so that the setup time and the hold time of the logic circuit 33 reach 0.5 ns, and the timing margin is optimized. At a temperature of −40° C., the voltage regulation circuit 31 provided in an embodiment of this disclosure may regulate the output voltage of the power supply circuit 32 to 0.93 V, so that the setup time and the hold time of the logic circuit 33 reach 0.5 ns, and the timing margin is optimized.

For the logic circuit 33 of the SS corner type, at a temperature of 125° C., the voltage regulation circuit 31 provided in an embodiment of this disclosure may regulate the output voltage of the power supply circuit 32 to 1.04 V, so that the setup time and the hold time of the logic circuit 33 reach 0.5 ns, and the timing margin is optimized. At the temperature of −40° C., the voltage regulation circuit 31 provided in an embodiment of this disclosure may regulate the output voltage of the power supply circuit 32 to 1.06 V, so that the setup time and the hold time of the logic circuit 33 reach 0.5 ns, and the timing margin is optimized.

It can be seen from Table 2 that, after the voltage regulation circuit 31 regulates the output voltage of the power supply circuit, both the logic circuit 33 of the SS corner type and the logic circuit 33 of the FF corner type can implement a same timing characteristic as the logic circuit of the TT corner type: the setup time and the hold time reach 0.5 ns.

In another possible implementation, the frequency difference signal may not only indicate the relative frequency value relationship between the clock signal CLK2 and the clock signal CLK3, but also indicate a frequency difference between the clock signal CLK2 and the clock signal CLK3. For example, when the frequency difference signal carries "10", it indicates that the frequency of the clock signal CLK2 is 10 Hz higher than the frequency of the clock signal CLK3; and when the frequency difference signal carries "−10", it indicates that the frequency of the clock signal CLK2 is 10 Hz lower than the frequency of the clock signal CLK3. In this case, the controller 3123 may further calculate a voltage regulation amplitude of the power supply circuit 32 based on the frequency difference, and control the power supply circuit 32 to regulate the output voltage based on the voltage regulation amplitude, so that the power supply circuit 32 can adapt the output voltage to the logic circuit 33 through voltage regulation for a small quantity of times, and achieve the effect shown in Table 2.

In addition, as shown in FIG. 6, the regulation circuit 312 may further include a low-pass filter 3124. An input end of the low-pass filter 3124 is connected to the frequency comparator 3122, and an output end of the low-pass filter 3124 is connected to the controller 3123. The low-pass filter 3124 may filter the frequency difference signal output by the frequency comparator 3122, and output a filtered frequency difference signal to the controller 3123. After the frequency difference signal is filtered by the low-pass filter 3124, impact of high-frequency noise in the frequency difference signal can be reduced, which helps improve accuracy of a determining result of the controller 3123.

In addition, to ensure normal operation of the logic circuit 33, the operation system may further include a phase-locked loop (phase locked loop, PLL) 34, and the phase-locked loop 34 is connected to the logic circuit. The phase-locked loop 34 may receive a clock signal CLK4, and provide a clock signal CLK5 for the logic circuit 33 based on the clock signal CLK4. A frequency of the clock signal CLK5 is the operating frequency of the logic circuit 33, and the clock signal CLK5 may be used as a clock signal for driving the logic circuit 33 to operate.

It should be noted that the clock signal CLK4 and the clock signal CLK3 may be different clock signals from a same clock source, or may be a same clock signal. For example, the clock signal CLK4 and the clock signal CLK3 may be clock signals provided by the system bus, and the clock signals may be clock signals generated by the crystal oscillator in the electronic device.

In a possible implementation, the logic circuit 33 may indicate the phase-locked loop 34 to output the clock signal CLK5 after the output voltage of the power supply circuit 32 is stable, in other words, after the voltage regulation circuit 31 completes regulation. In this implementation, an operation error of the logic circuit 33 caused because the output voltage of the power supply circuit 32 is not matched can be avoided, and therefore stability of the logic circuit 33 can be further improved.

It may be understood that the power supply circuit 32 may include one power supply, or may include a plurality of power supplies. For example, the power supply circuit 32 may include a power supply 1 and a power supply 2. The power supply 1 is connected to the voltage regulation circuit 31, and may provide a first output voltage for the voltage regulation circuit 31. The power supply 2 is connected to the logic circuit 33, and may provide a second output voltage for the logic circuit 33. The regulation circuit 312 is separately connected to the power supply 1 and the power supply 2.

In this case, the regulation circuit may separately control, based on the clock signal CLK1, the power supply 1 to regulate the first output voltage, and the power supply 2 to regulate the second output voltage. It should be noted that the regulation circuit needs to control the output voltages of the power supply 1 and the power supply 2, so that the first output voltage keeps consistent with the second output voltage.

Based on a same technical concept, an embodiment of this disclosure further provides an integrated circuit. The integrated circuit (integrated circuit, IC) is a micro electronic device or component, and may be understood as a circuit that has a specific function and that integrates a specific quantity of common electronic components, such as resistors, capacitors, and transistors, and connection lines between these components using a semiconductor process. For example, chips such as a system on chip (system on chip, SoC) and a central processing unit (central processing unit, CPU) may be implemented using the integrated circuit.

The SoC is used as an example. The SoC may also be referred to as a system-level chip. The SoC is an integrated circuit with a dedicated target and is embedded software.

Most core components of an electronic device may be integrated in the SoC, to form a micro system.

Figure 7:
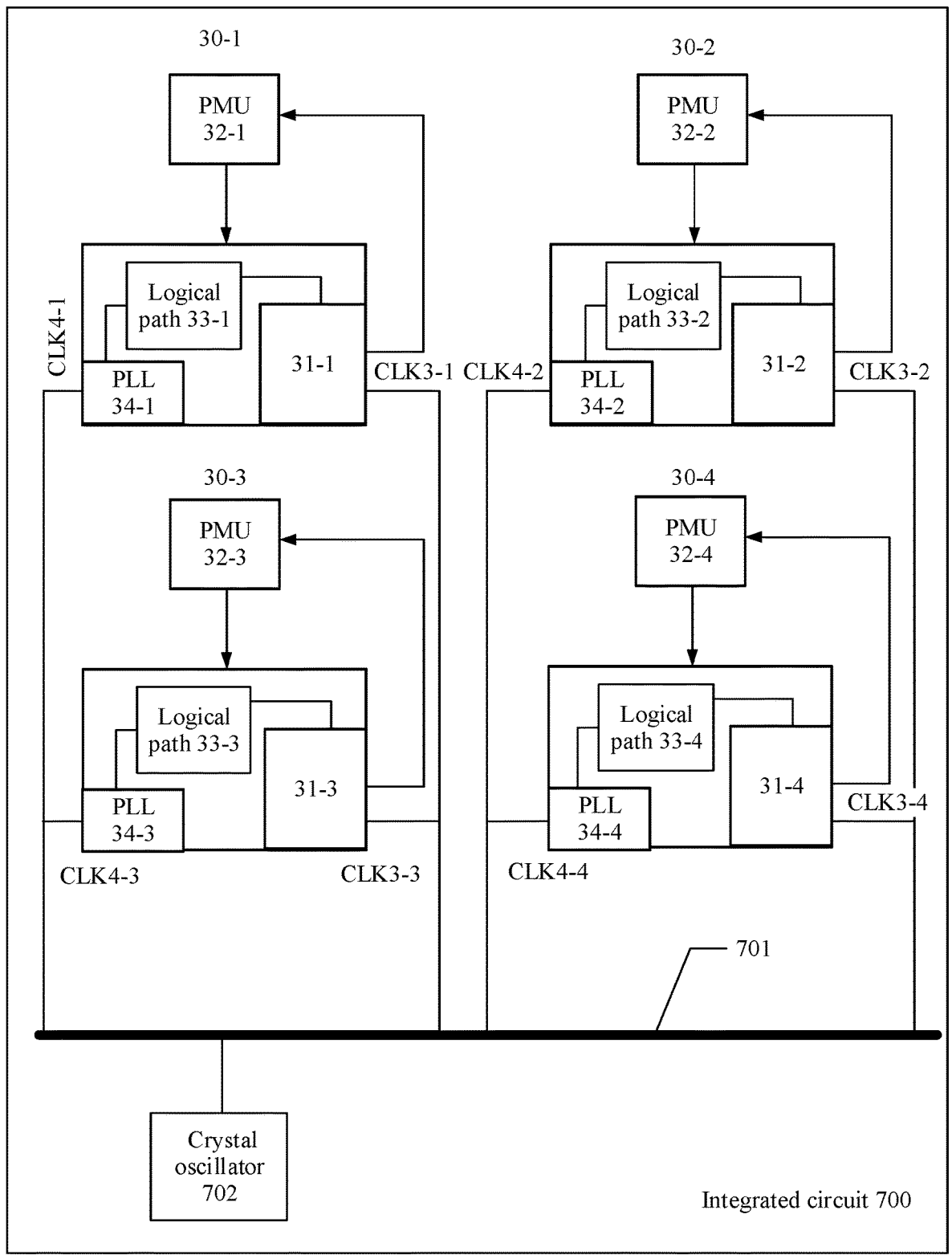
FIG. 7 is a schematic diagram of a structure of an integrated circuit according to an embodiment of this disclosure.

For example, the integrated circuit provided in an embodiment of this disclosure may be shown in FIG. 7. The integrated circuit 700 includes at least one operation system. As shown in FIG. 7, the integrated circuit 700 includes operation systems 30-1 to 30-4. The operation systems 30-1 to 30-4 are separately connected to a system bus 701.

The system bus 701 may provide corresponding clock signals CLK3 and CLK4 for the operation systems 30-1 to 30-4. In an embodiment, the system bus 701 may provide a clock signal CLK4-1 for a PLL 34-1 in the operation system 30-1, a clock signal CLK3-1 for a voltage regulation circuit 31-1, a clock signal CLK4-2 for a PLL 34-2 in an operation system 30-2, a clock signal CLK3-2 for a voltage regulation circuit 31-2, a clock signal CLK4-3 for a PLL 34-3 in an operation system 30-3, a clock signal CLK3-3 for a voltage regulation circuit 31-3, a clock signal CLK4-4 for a PLL 34-4 in the operation system 30-4, and a clock signal CLK3-4 for a voltage regulation circuit 31-4.

For example, the system bus 701 may be a peripheral component interconnect standard (peripheral component interconnect, PCI for short) bus, an extended industry standard architecture (extended industry standard architecture, EISA for short) bus, or the like. The system bus 704 may be classified into an address bus, a data bus, a control bus, and or the like. For ease of representation, only one bold line is used for representation in FIG. 7, but this does not mean that there is only one bus or only one type of bus.

In an embodiment of this disclosure, the system bus 704 may separately provide a same clock signal for the operation systems 30-1 to 30-4. In other words, the clock signals CLK4-1 to CLK4-4 and the clock signals CLK3-1 to CLK3-4 may be a same clock signal, namely, a system-level clock signal.

For example, the integrated circuit 700 may further include a crystal oscillator 702. The crystal oscillator 702 may generate a system-level clock signal, and separately transmit the system-level clock signal to each operation system through the system bus 701.

In a possible implementation, the system bus 704 may further separately transmit configuration information provided for the voltage regulation circuits 31-1 to 31-4.

In an embodiment of this disclosure, a logic circuit and a voltage regulation circuit that are located in a same operation system may be integrated into a same integrated module. In other words, the logic circuit and the voltage regulation circuit may be manufactured using a same production process, so that the logic circuit and the voltage regulation circuit have a same process corner type. In a possible implementation, the PLLs in the operation system may alternatively be integrated into an integrated module. The integrated module may be further integrated into the integrated circuit 700 using processes such as bonding and welding.

It may be understood that different logic circuits in the integrated circuit 700 may be configured to implement different logical operation functions. For example, the logic circuit 33-1, the PLL 34-1, and the voltage regulation circuit 31-1 are integrated in a same integrated module as a first CPU in the integrated circuit 700. The logic circuit 33-2, the PLL 34-2, and the voltage regulation circuit 31-2 are integrated in a same integrated module as a second CPU in the integrated circuit 700. The logic circuit 33-3, the PLL 34-3, and the voltage regulation circuit 31-3 are integrated into a same integrated module as a GPU in the integrated circuit 700. The logic circuit 33-4, the PLL 34-4, and the voltage regulation circuit 31-4 are integrated in a same integrated module as a digital signal processor (digital signal processor, DSP) in the integrated circuit 700.

It should be noted that different logic circuits in the integrated circuit 700 may have a same operating frequency or different operating frequencies. For example, the logic circuit 33-1 operates at 2.3 GHz, the logic circuit 33-1 operates at 1.8 GHz, and the logic circuit 33-3 and the logic circuit 33-4 respectively operates at 1.5 GHz and 1 GHz. An integrated module of each operation system of the integrated circuit 700 is integrated with a voltage regulation circuit.

In an actual application process, a delay of an oscillator in the voltage regulation circuit may be configured based on an operating frequency of each logic circuit based on configuration information, to optimize a timing margin of each logic circuit to a maximum extent, and reduce power consumption of the logic circuit 33 to a maximum extent.

In addition, the integrated circuit 700 may further adaptively adjust the operating frequency of each logic circuit based on a change of an operation task of each logic circuit. For example, when there are a large quantity of operation tasks, the operating frequency of the logic circuit may be adjusted to 2 GHz, or when there are a small quantity of operation tasks, the operating frequency of the logic circuit may be adjusted to 1 GHz.

The logic circuit 33-1 is used as an example. When a quantity of operation tasks of the logic circuit 33-1 increases, the integrated circuit 700 may increase a frequency of a clock signal CLK51 (not shown in the figure) output by the PLL 34-1. In addition, a frequency division multiple of a frequency divider 3121 in the voltage regulation circuit 31-1 is increased, so that the voltage regulation circuit 31-1 can synchronously increase an output voltage of the power supply circuit 32-1. In this way, the operating frequency of the logic circuit 33-1 is increased and a logical operation speed of the logic circuit 33-1 is increased.

Based on a same technical concept, an embodiment of this disclosure further provides a voltage regulation method. The method may be applied to the voltage regulation circuit 31 provided in any one of the foregoing embodiments. For example, the voltage regulation method provided in an embodiment of this disclosure may be shown in FIG. 8, and mainly includes the following steps.

S801: Generate a first clock signal using an oscillator based on an output voltage of a power supply circuit, where a process corner type of the oscillator is the same as a process corner type of a logic circuit, and the output voltage of the power supply circuit is used to supply power to the logic circuit.

S802: Control, based on the first clock signal, the power supply circuit to regulate the output voltage.

For example, that the voltage regulation circuit 31 controls, based on the first clock signal, the power supply circuit 32 to regulate the output voltage mainly includes: performing frequency division on the first clock signal based on the frequency division multiple to obtain the second clock signal; and controlling, based on the relative frequency value relationship between the second clock signal and the reference clock signal, the power supply circuit 32 to regulate the output voltage.

The quotient obtained through division of the frequency of the first clock signal output by the oscillator 311 of the TT corner type by the frequency of the reference clock signal is the foregoing frequency division multiple.

For example, when the voltage regulation circuit 31 controls, based on the relative frequency value relationship between the second clock signal and the reference clock signal, the power supply circuit 32 to regulate the output voltage, at least any one of the following cases may occur:

when the frequency of the second clock signal is greater than the frequency of the reference clock signal, the power supply circuit 32 is controlled to decrease the output voltage; or when the frequency of the second clock signal is less than the frequency of the reference clock signal, the power supply circuit 32 is controlled to increase the output voltage.

Figure 9:
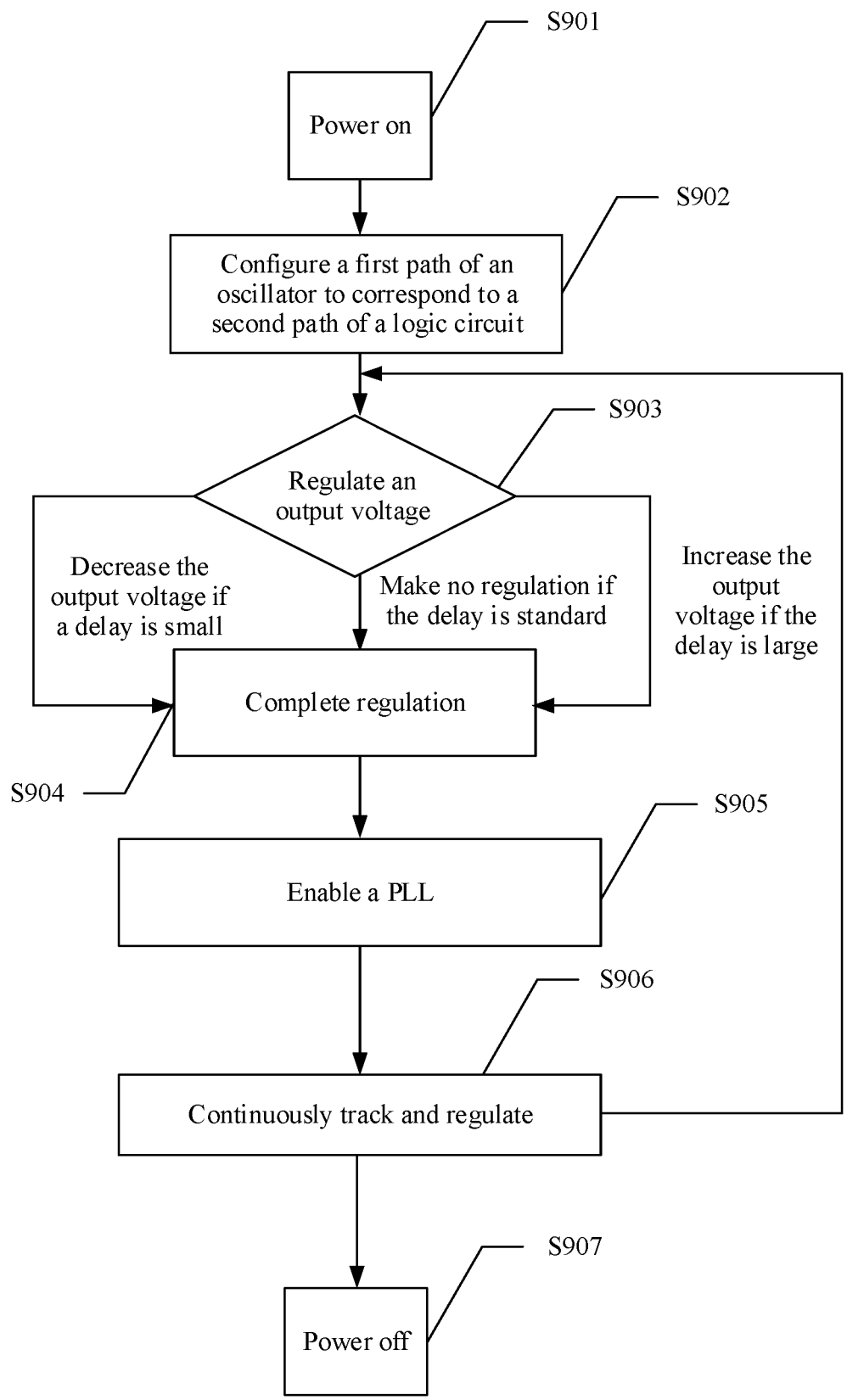
FIG. 9 is a schematic flowchart of a specific voltage regulation method according to an embodiment of this disclosure.

Next, FIG. 9 is used as an example to further describe application of the voltage regulation method provided in an embodiment of this disclosure in the operation system 30. As shown in FIG. 9, the method mainly includes the following steps:

S901: Power on. The power supply circuit 32 outputs the voltage to supply power to the voltage regulation circuit 31 and the logic circuit 33. In an embodiment of this disclosure, the initial output voltage of the power supply circuit 32 may be set based on the operating frequency of the logic circuit 33.

S902: Configure the first path of the oscillator 311 to correspond to the second path of the logic circuit 33. In a possible implementation, the second path may be the logical path with the critical timing margin in the logic circuit 33. A specific implementation process is not described again.

S903: The voltage regulation circuit 31 indicates the power supply circuit 32 to regulate the output voltage. In an embodiment, the following three cases may mainly occur: (1) When the first path has a small delay, the voltage regulation circuit 31 indicates the power supply circuit 32 to decrease the output voltage; (2) When the first path has a standard delay, the voltage regulation circuit 31 does not indicate the power supply circuit 32 to regulate the output voltage; and (3) When the first path has a large delay, the voltage regulation circuit 31 indicates the power supply circuit to increase the output voltage.

S904: The voltage regulation circuit 31 indicates the power supply circuit 32 to regulate the output voltage until the output voltage of the power supply circuit 32 matches the logic circuit 33.

S905: Configure the PLL 34 based on the operating frequency of the logic circuit 33, and enable the PLL 34. In this way, the PLL 34 may output the clock signal CLK5 that matches the operating frequency of the logic circuit 33.

S906: The voltage regulation circuit 31 continuously tracks and regulates the output voltage of the power supply circuit 32. In an embodiment, in an operating process of the logic circuit 33, the delay of the logic circuit 33 may also change. For example, factors such as a change of a chip temperature may affect the delay of the logic circuit 33.

In an embodiment of this disclosure, because the voltage regulation circuit 31 and the logic circuit 33 are integrated into a same chip, it may be considered that temperatures of the voltage regulation circuit 31 and the logic circuit 33 are the same. When the temperature of the logic circuit 33 changes, the temperature of the voltage regulation circuit 31 also changes. As a result, the delay of the oscillator 311 changes, and the frequency of the clock signal CLK1 generated by the oscillator 311 changes. The regulation circuit 312 does not need to learn a current temperature condition, and only needs to control the power supply circuit 32 to regulate the output voltage after the frequency of the clock signal CLK1 deviates from the standard frequency, so that the frequency of the clock signal CLK1 can return to the standard frequency subsequently.

S907: Power off. The power supply circuit 32 stops outputting a voltage.

A person skilled in the art should understand that embodiments of this disclosure may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts or block diagrams of the method, the device (system), and the computer program product according to this application. It should be understood that computer program instructions may be used to implement each process or each block in the flowcharts or the block diagrams and a combination of a process or a block in the flowcharts or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts or in one or more blocks in the block diagrams.

Clearly, persons skilled in the art can make various modifications and variations to this application without departing from the protection scope of this disclosure. In this way, this application is intended to cover these modifications and variations of this disclosure provided that they fall within the scope of protection defined by the following claims and their equivalent technologies.

What is claimed is:

1. An apparatus, comprising:
a voltage regulation circuit, comprising:
a regulation circuit; and
an oscillator, coupled to generate a first clock signal to the regulation circuit;
a power supply circuit, coupled to receive a control signal from the regulation circuit, wherein the oscillator is coupled to receive an output voltage from the power supply circuit;
a phase-locked loop (PLL), coupled to:
receive a fourth clock signal, wherein the fourth clock signal is a reference clock signal and is independent from the first clock signal; and generate a fifth clock signal based on the fourth clock signal; and a logic circuit, coupled to receive the output voltage from power supply circuit and the fifth clock signal from the PLL, wherein a process corner of the logic circuit is the same as a process corner of the oscillator, wherein the fifth clock signal is a driving clock signal for the logic circuit, and wherein the first clock signal is used to distinguish the logic circuit of different process corner type;

wherein the oscillator comprises:

a first path, wherein a delay of the first path is positively correlated with a delay of a second path of the logic circuit; and the oscillator is configured to:

generate the first clock signal through the first path based on the output voltage of the power supply circuit;

wherein the delay of the first path is linearly positively correlated with the delay of the second path;

wherein the plurality of serially-connected first gate circuits are configured to: make the delay of the first path linearly positively correlated with the delay of the second path;

wherein the oscillator is further configured to configure a plurality of gate circuits in the oscillator as the plurality of first gate circuits in the first path based on received configuration information;

wherein the plurality of gate circuits form a first series structure, the first series structure comprises a plurality of delay circuits, wherein each delay circuit comprises one or more gate circuits, an input signal and an output signal of each delay circuit have a same phase, and the oscillator further comprises:

a first selector, wherein an output end of each delay circuit is connected to a data input end of the first selector, the first selector is configured to:

output a first intermediate signal based on received first configuration information, wherein the first configuration information indicates a target delay circuit in the plurality of delay circuits, and the first intermediate signal is an output signal of the target delay circuit; and a supplementary inverter, wherein an input end of the first series structure is connected to an output end of the supplementary inverter, an output end of the first selector is connected to an input end of the supplementary inverter, gate circuits between the input end of the first series structure and an output end of the target delay circuit are the plurality of first gate circuits, and wherein the supplementary inverter is configured to:

receive the first intermediate signal; and output the first clock signal based on the first intermediate signal.

2. The apparatus of claim 1, wherein the second path is a logical path with a critical timing margin in the logic circuit.

3. The apparatus of claim 1, wherein the first path comprises a plurality of serially-connected first gate circuits.

4. The apparatus of claim 3, wherein each of the first gate circuits comprises an inverter.

5. The apparatus of claim 3, wherein each first gate circuit in the first path corresponds to at least one second gate circuit in the second path, wherein a function type of the first gate circuit is the same as a function type of the corresponding at least one second gate circuit, and wherein a threshold voltage type of the first gate circuit is the same as a threshold voltage type of the corresponding at least one second gate circuit.

6. The apparatus of claim 5, wherein the threshold voltage type of the first gate circuit is any one of the following threshold voltage types:

an ultra-high threshold voltage (uhvt), a high threshold voltage (hvt), a standard threshold voltage (svt), a low threshold voltage (lvt), or an ultra-low threshold voltage (ulvt).

7. The apparatus of claim 1, wherein the regulation circuit comprises:

a frequency divider, separately connected to the oscillator and a frequency comparator, wherein the frequency divider is configured to perform frequency division on the first clock signal based on a frequency division multiple value to obtain a second clock signal;

the frequency comparator, connected to a controller, wherein the frequency comparator is configured to receive a reference clock signal, and output a frequency difference signal based on the second clock signal and the reference clock signal, wherein the frequency difference signal indicates a relative frequency value relationship between the second clock signal and the reference clock signal; and the controller, connected to the power supply circuit, wherein the controller is configured to control the output voltage of the power supply circuit based on the frequency difference signal.

8. The apparatus of claim 7, wherein a quotient value obtained through division of a frequency of a first clock signal output by an oscillator of a typical typical process corner TT corner type by a frequency of the reference clock signal is the frequency division multiple value.

9. The apparatus of claim 7, wherein the controller is configured to:

control the power supply circuit to decrease the output voltage of the power supply circuit, wherein the frequency difference signal indicates that a frequency of the second clock signal is greater than the frequency of the reference clock signal; or control the power supply circuit to increase the output voltage of the power supply circuit, wherein the frequency difference signal indicates that the frequency of the second clock signal is less than the frequency of the reference clock signal.

10. The apparatus of claim 1, wherein the corner type is one of a fast fast corner type, a slow slow corner type, or a typical typical corner type.

11. An apparatus, comprising:

a voltage regulation circuit, comprising:

a regulation circuit; and an oscillator, coupled to generate a first clock signal to the regulation circuit;

a power supply circuit, coupled to receive a control signal from the regulation circuit, wherein the oscillator is coupled to receive an output voltage from the power supply circuit;

a phase-locked loop (PLL), coupled to:

receive a fourth clock signal, wherein the fourth clock signal is a reference clock signal and is independent from the first clock signal; and generate a fifth clock signal based on the fourth clock signal; and a logic circuit, coupled to receive the output voltage from power supply circuit and the fifth clock signal from the PLL, wherein a process corner of the logic circuit is the same as a process corner of the oscillator, wherein the fifth clock signal is a driving clock signal for the logic circuit, and wherein the first clock signal is used to distinguish the logic circuit of different process corner type;

wherein the oscillator comprises:

a first path, wherein a delay of the first path is positively correlated with a delay of a second path of the logic circuit; and the oscillator is configured to:

generate the first clock signal through the first path based on the output voltage of the power supply circuit;

wherein the delay of the first path is linearly positively correlated with the delay of the second path;

wherein the plurality of serially-connected first gate circuits are configured to: make the delay of the first path linearly positively correlated with the delay of the second path;

wherein the oscillator is further configured to configure a plurality of gate circuits in the oscillator as the plurality of first gate circuits in the first path based on received configuration information;

wherein a first part of the plurality of gate circuits forms a second series structure, wherein the second series structure comprises a plurality of low-load delay circuits, each low-load delay circuit comprises one or more gate circuits, an input signal and an output signal of each low-load delay circuit have a same phase;

wherein a second part of the plurality of gate circuits forms a third series structure, wherein the third series structure comprises a plurality of high-load delay circuits, each high-load delay circuit comprises one or more gate circuits, an input signal and an output signal of each high-load delay circuit have a same phase;

and wherein the oscillator further comprises:

a second selector, wherein an output end of each low-load delay circuit is connected to a data input end of the second selector, and an input end of the third series structure is connected to the second selector, and wherein the second selector is configured to:

output a second intermediate signal based on received second configuration information, wherein the second configuration information indicates a target low-load delay circuit in the plurality of low-load delay circuits, the second intermediate signal is an output signal of the target low-load delay circuit, and gate circuits between the input end of the second series structure and an output end of the target low-load delay circuit are the first part of the plurality of first delay circuits;

a third selector, wherein an output end of each high-load delay circuit is connected to a data input end of the third selector, and wherein the third selector is configured to output a third intermediate signal based on received third configuration information, wherein the third configuration information indicates a target high-load delay circuit in the plurality of high-load delay circuits, the third intermediate signal is an output signal of the target high-load delay circuit, and gate circuits between the input end of the third series structure and an output end of the target high-load delay circuit are the second part of the plurality of first delay circuits; and a supplementary inverter, wherein an input end of the second series structure is connected to an output end of the supplementary inverter, the wherein supplementary inverter is configured to receive the third intermediate signal, and output the first clock signal based on the third intermediate signal.

12. The apparatus of claim 11, wherein the second path is a logical path with a critical timing margin in the logic circuit.

13. The apparatus of claim 11, wherein the first path comprises a plurality of serially-connected first gate circuits.

14. The apparatus of claim 13, wherein each of the first gate circuits comprises an inverter.

15. The apparatus of claim 13, wherein each first gate circuit in the first path corresponds to at least one second gate circuit in the second path, wherein a function type of the first gate circuit is the same as a function type of the corresponding at least one second gate circuit, and wherein a threshold voltage type of the first gate circuit is the same as a threshold voltage type of the corresponding at least one second gate circuit.

16. The apparatus of claim 15, wherein the threshold voltage type of the first gate circuit is any one of the following threshold voltage types:

an ultra-high threshold voltage (uhvt), a high threshold voltage (hvt), a standard threshold voltage (svt), a low threshold voltage (lvt), or an ultra-low threshold voltage (ulvt).

17. The apparatus of claim 11, wherein the regulation circuit comprises:

a frequency divider, separately connected to the oscillator and a frequency comparator, wherein the frequency divider is configured to perform frequency division on the first clock signal based on a frequency division multiple value to obtain a second clock signal;

the frequency comparator, connected to a controller, wherein the frequency comparator is configured to receive a reference clock signal, and output a frequency difference signal based on the second clock signal and the reference clock signal, wherein the frequency difference signal indicates a relative frequency value relationship between the second clock signal and the reference clock signal; and the controller, connected to the power supply circuit, wherein the controller is configured to control the output voltage of the power supply circuit based on the frequency difference signal.

18. The apparatus of claim 17, wherein a quotient value obtained through division of a frequency of a first clock signal output by an oscillator of a typical typical process corner TT corner type by a frequency of the reference clock signal is the frequency division multiple value.

19. The apparatus of claim 17, wherein the controller is configured to:

control the power supply circuit to decrease the output voltage of the power supply circuit, wherein the frequency difference signal indicates that a frequency of the second clock signal is greater than the frequency of the reference clock signal; or control the power supply circuit to increase the output voltage of the power supply circuit, wherein the frequency difference signal indicates that the frequency of the second clock signal is less than the frequency of the reference clock signal.

20. The apparatus of claim 11, wherein the corner type is one of a fast fast corner type, a slow slow corner type, or a typical typical corner type.

* * * * *